(12) United States Patent
Gunn et al.

(10) Patent No.: US 11,268,827 B2
(45) Date of Patent: *Mar. 8, 2022

(54) VERTICAL SITUATION DISPLAY WITH INTERACTIVE SPEED PROFILE BAR

(71) Applicant: The Boeing Company, Chicago, IL (US)

(72) Inventors: Peter D. Gunn, Redmond, WA (US); John Wiedemann, Bothell, WA (US); Alireza Majd, Seattle, WA (US); Robert J. Myers, Mukilteo, WA (US); Brian D. Gilbert, Seattle, WA (US)

(73) Assignee: The Boeing Company, Chicago, IL (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/777,333

(22) Filed: Jan. 30, 2020

(65) Prior Publication Data
US 2020/0166374 A1 May 28, 2020

Related U.S. Application Data

(63) Continuation of application No. 16/146,375, filed on Sep. 28, 2018, now Pat. No. 10,584,979.

(51) Int. Cl.
*G01C 23/00* (2006.01)
*G08G 5/00* (2006.01)

(52) U.S. Cl.
CPC .......... *G01C 23/00* (2013.01); *G08G 5/0021* (2013.01); *G08G 5/0047* (2013.01)

(58) Field of Classification Search
CPC ..... G01C 23/00; G08G 5/0021; G08G 5/0047

USPC .......................................................... 701/3
See application file for complete search history.

(56) References Cited

U.S. PATENT DOCUMENTS

| 4,811,230 | A | | 3/1989 | Graham et al. |
| 6,163,743 | A | * | 12/2000 | Bomans ............... G05D 1/0607 |
| | | | | 701/3 |
| 7,188,007 | B2 | | 3/2007 | Boorman et al. |
| 7,203,577 | B2 | | 4/2007 | Gunn et al. |
| 7,418,319 | B2 | | 8/2008 | Chen et al. |
| 7,512,464 | B2 | | 3/2009 | Tarleton et al. |
| 7,903,000 | B2 | | 3/2011 | Hammack et al. |

(Continued)

*Primary Examiner* — Isaac G Smith
(74) *Attorney, Agent, or Firm* — Ostrager Chong Flaherty & Broitman P.C.

(57) ABSTRACT

An interactive speed profile bar that enables crew awareness of the overall planned flight trajectory speed profile. The speed profile bar will have a graphical depiction (e.g., virtual buttons having alphanumeric symbology) of some or all of the speed segments of the speed profile. Each graphical element (e.g., virtual button) includes symbology identifying the applicable speed mode and corresponding target speed change. Each speed segment will start at the inflection point where the speed change will occur in the flight plan, and will continue until the next trajectory speed change. The speed profile bar will be interactive, allowing the flight crew to select the speed segment to change, in response to which selection the system displays graphical user interface elements showing a menu of the available speed segment options. Each individual speed segment is represented by an individual virtual button that can be selected by touching the screen or other input device.

20 Claims, 20 Drawing Sheets

(56) References Cited

U.S. PATENT DOCUMENTS

| | | |
|---|---|---|
| 8,793,039 B1 | 7/2014 | Hammack et al. |
| 8,843,250 B2 | 9/2014 | Tucker et al. |
| 9,620,021 B1* | 4/2017 | Barber .................. B64D 43/00 |
| 2005/0143871 A1* | 6/2005 | Boorman ............. G08G 5/0052 |
| | | 701/3 |
| 2006/0195234 A1 | 8/2006 | Chen et al. |
| 2011/0118908 A1 | 5/2011 | Boorman et al. |
| 2015/0348423 A1* | 12/2015 | Chaubey ............. G05D 1/0005 |
| | | 701/18 |

\* cited by examiner

VERTICAL SITUATION DISPLAY WITH INTERACTIVE SPEED PROFILE BAR

RELATED PATENT APPLICATION

This application is a continuation of and claims priority from U.S. patent application Ser. No. 16/146,375 filed on Aug. 28, 2018, which issued as U.S. Pat. No. 10,584,979 on Mar. 10, 2020.

BACKGROUND

This disclosure generally relates to systems and methods for viewing speed profile, and controlling the speed of an aircraft, and more particularly relates to systems and methods for enabling a pilot to manually intervene in order to depart from a preprogrammed speed profile.

Modern commercial aircraft are equipped with several aircraft systems to manage their flight profile and configuration. For example, one of the several functions of the flight management computers (FMC) entails the planning and management of the flight plan of an aircraft from takeoff to landing. The mode control panel provides means for pilots to manage certain aspects, such as controlling to the lateral and vertical flight profiles of an aircraft, or managing the airplane tactically. Both the FMC and mode control panel may be used to control the autopilot and autothrottle systems, which may in turn send commands to other aircraft systems such as the engines and flight control systems to direct and control the aircraft consistent with the pilots' commands. Feedback as to the performance of the aircraft in relation to the pilots' commands may be available in a number of locations in the cockpit (flight deck) including the primary flight displays, navigation displays, engine displays, mode control panels, control display units, and crew alerting displays.

As aircraft and the airspace environment in which they operate have evolved to become more complex, aircraft systems available to pilots, as well as the flight profiles pilots manage, have become more complex. One aspect of a flight profile whose management poses a challenge is understanding and managing the entire speed profile. The speed profile of modern commercial aircraft is influenced by myriad inputs. For example, such input may include the aircraft's speed capability and optimum economic performance given certain input constraints, such as the aircraft's configuration, available weather data, ATC tactical speed requests for spacing etc., and desired time of arrival control. The speed profile may also be influenced by altitude-based restrictions, such as speed at-or-less than 250 knots below 10,000 feet. Furthermore, an aircraft's speed may also be constrained by speed restrictions or constraints attached to waypoints that define the aircraft's route. In addition, performance requirements related to new air traffic management (ATM) functions such as continuous descent approaches may also have to be factored in to obtain a more comprehensive assessment of the speed profile for an aircraft.

The combination of these various types of influences on the aircraft's speed, which are managed with safety and fuel economy objectives as well, can result in a complicated speed schedule that can be difficult to comprehend utilizing the aforementioned multiple systems currently engaged in speed profile management. The need to understand, monitor and utilize these different systems contributes to increased workload, and potentially to errors or anomalies. Thus a tool that simplifies the flight crew's awareness and management of the aircraft speed profile in all phases of flight would be advantageous.

SUMMARY

The subject matter disclosed in some detail below is directed to a speed profile management tool that enables pilots to view and modify the aircraft's speed profile in a simple and efficient manner. The tool is a graphical user interface that enables a pilot to interact with a speed profile management module. More specifically, the graphical user interface takes the form of an interactive speed profile bar that is viewable on a display unit in conjunction with a vertical situation display. The speed profile bar may be displayed in the same window with the vertical situation display or may be displayed in a window overlaid on the window in which the vertical situation display appears. The interactive speed profile bar software is configured to enable a pilot to easily modify the aircraft's speed profile, thus reducing workload and potential errors.

The interactive speed profile bar disclosed in some detail below enables crew awareness of the overall planned flight trajectory speed profile. The speed profile bar will have a graphical depiction (e.g., virtual buttons having alphanumeric symbology) of some or all of the speed segments of the speed profile. Each graphical element (e.g., virtual button) includes symbology identifying the applicable speed mode and corresponding target speed change. Each speed segment will start at the inflection point where the speed change will occur in the flight plan, and will continue until the next trajectory speed change. The speed profile bar will be interactive, allowing the flight crew to select a speed segment to be changed. In response to that selection, the system displays graphical user interface elements showing a menu of the available speed segment options. Each individual speed segment is represented by an individual virtual button (hereinafter "speed bar button") that can be selected by touching the screen or other input device (e.g., a cursor control device such as a trackpad, trackball, mouse, rotary dial, etc.). A further advantageous feature is the provision of means for speed bar button decluttering to show the speed bar buttons that may be too narrow to display the applicable speed mode and target speed within the area occupied by the speed bar button.

Although various proposed implementations of systems and methods for enabling a pilot to manage a speed profile using an interactive speed profile bar that is viewable in conjunction with a vertical situation display will be described in some detail below, one or more of those proposed implementations may be characterized by one or more of the following aspects.

One aspect of the subject matter disclosed in detail below is a flight information display system for depicting flight path information of an aircraft, the flight information display system comprising a display unit and a computer system programmed to control operation of the display unit, wherein the computer system is configured to control the display unit to concurrently display the following graphical elements: a vertical situation display representing a planned vertical flight path of the aircraft; and an interactive speed profile bar comprising at least one speed bar button, the interactive speed profile bar being useable by a pilot for changing the speed profile of the aircraft to fly at speeds in accordance with a selected speed segment, wherein the at least one speed bar button has first alphanumeric symbology identifying a first speed mode and an associated first target speed of a first speed segment included in a speed profile. In most instances, the interactive speed profile bar comprises a multiplicity of speed bar buttons, each of the multiplicity of speed bar buttons having respective alphanumeric symbology identifying a respective speed mode and a respective associated target speed which characterize a respective speed segment included in the speed profile. The computer system is further configured to cause the display unit to: display graphical elements representing a multiplicity of pilot-selectable mutually exclusive speed segment options in response to pilot selection of the at least one speed bar button; and display second alphanumeric symbology in the at least one speed bar button instead of the first alphanumeric symbology in response to pilot selection of a speed segment option, the second alphanumeric symbology identifying a second speed mode and an associated second target speed of the selected speed segment.

In accordance with one proposed implementation of the system described in the immediately preceding paragraph, the speed profile includes first and second speed segments having first and second ranges respectively, and the speed profile bar includes a first speed bar button having a first button width corresponding to a first range of the first speed segment and a second speed bar button having a second button width corresponding to a second range of the second speed segment, the ratio of the first button width to the second button width being equal to the ratio of the first range to the second range.

Another aspect of the subject matter disclosed in detail below is a flight information display system for depicting flight path information of an aircraft, the flight information display system comprising a display unit and a computer system programmed to control operation of the display unit, wherein the computer system is configured to control the display unit to concurrently display the following graphical elements: a first vertical situation display representing a planned vertical flight path of the aircraft; and a first interactive speed profile bar comprising a special speed bar button, the interactive speed profile bar being useable by a pilot for changing the speed profile of the aircraft to fly at speeds in accordance with a selected speed segment, wherein the special speed bar button has symbology indicating that other symbology identifying multiple speed segments of a speed profile is available for viewing. The computer system is further configured to: (a) cause the display unit having a range scale with increased fineness and representing only a portion of the planned vertical flight path of the aircraft previously displayed in response to pilot selection of the special speed bar button; and (b) cause the display unit to display a second interactive speed profile bar not including the special speed bar button and comprising first and second speed bar buttons having first and second alphanumeric symbology identifying respective speed modes and respective associated target speeds which respectively characterize first and second speed segments having first and second ranges respectively. The first speed bar button has a first button width corresponding to the first range of the first speed segment and the second speed bar button has a second button width corresponding to the second range of the second speed segment, the ratio of the first button width to the second button width being equal to the ratio of the first range to the second range.

As used herein, the terms "first vertical situation display" and "second vertical situation display" refer to respective graphical data displayed on a display unit at different times. For example, the "second vertical situation display" may present a portion (less than all) of the first vertical situation display with a magnified horizontal scale.

A further aspect of the subject matter disclosed in detail below is a method for displaying flight information on a display unit, the method comprising: displaying a vertical situation display representing a planned vertical flight path of an aircraft on the display unit; displaying an interactive speed profile bar comprising at least one speed bar button on the display unit, wherein the at least one speed bar button has first alphanumeric symbology identifying a first speed mode and an associated first target speed of a first speed segment included in a speed profile; and using the interactive speed profile bar to change the speed profile of the aircraft to fly at speeds in accordance with a selected speed segment. In most instances, the interactive speed profile bar comprises a multiplicity of speed bar buttons, each of the multiplicity of speed bar buttons having respective alphanumeric symbology identifying a respective speed mode and a respective associated target speed which characterize a respective speed segment included in the speed profile.

In accordance with one embodiment of the method described in the immediately preceding paragraph, the method further comprises: selecting the at least one speed bar button, which selecting is performed by a pilot; displaying graphical elements representing a multiplicity of pilot-selectable mutually exclusive speed segment options in response to selecting the at least one speed bar button; selecting one of the speed segment options, which selecting is performed by the pilot; displaying second alphanumeric symbology in the at least one speed bar button instead of the first alphanumeric symbology in response to selecting one of the speed segment options, the second alphanumeric symbology identifying a second speed mode and an associated second target speed of the selected speed segment; and changing the speed of the aircraft so that the aircraft flies at speeds in accordance with the selected speed segment of the speed profile.

In accordance with one proposed implementation of the above-described method, the speed profile includes first and second speed segments having first and second ranges respectively, in which case the speed profile bar includes a first speed bar button having a first button width corresponding to a first range of the first speed segment and a second speed bar button having a second button width corresponding to a second range of the second speed segment, the ratio of the first button width to the second button width being equal to the ratio of the first range to the second range.

Yet another aspect of the subject matter disclosed in detail below is a method for displaying flight information on a display unit, the method comprising: displaying a first vertical situation display representing a planned vertical flight path of an aircraft on the display unit; displaying a first interactive speed profile bar comprising a special speed bar button on the display unit, wherein the special speed bar button has symbology indicating that other symbology identifying multiple speed segments of a speed profile is available for viewing; and using the interactive speed profile bar to change the speed profile of the aircraft to fly at speeds in accordance with a selected speed segment. This method further comprises: selecting the special speed bar button, which selecting is performed by a pilot; displaying a second vertical situation display (instead of the first situation display) on the display unit having a range scale with increased fineness and representing only a portion of the planned vertical flight path of the aircraft previously displayed in response to selecting the special speed bar button (e.g., the second vertical situation display may show a portion of the first vertical situation display with a magnified horizontal scale); and displaying a second interactive speed profile bar in response to selecting the special speed bar button. The second interactive speed profile bar does not include the special speed bar button and comprises first and second speed bar buttons having first and second alphanumeric symbology identifying respective speed modes and respective associated target speeds which respectively characterize first and second speed segments having first and second ranges respectively. This method may further comprise: selecting the first speed bar button, which selecting is performed by a pilot; displaying graphical elements representing a multiplicity of pilot-selectable mutually exclusive speed segment options in response to selecting the first speed bar button; selecting one of the speed segment options, which selecting is performed by the pilot; and displaying third alphanumeric symbology in the first speed bar button instead of the first alphanumeric symbology in response to selecting one of the speed segment options, the third alphanumeric symbology identifying the selected speed segment.

Other aspects of systems and methods for enabling a pilot to manage a speed profile using an interactive speed profile bar that is viewable in conjunction with a vertical situation display are disclosed below.

BRIEF DESCRIPTION OF THE DRAWINGS

The features, functions and advantages discussed in the preceding section may be achieved independently in various embodiments or may be combined in yet other embodiments. Various proposed implementations will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
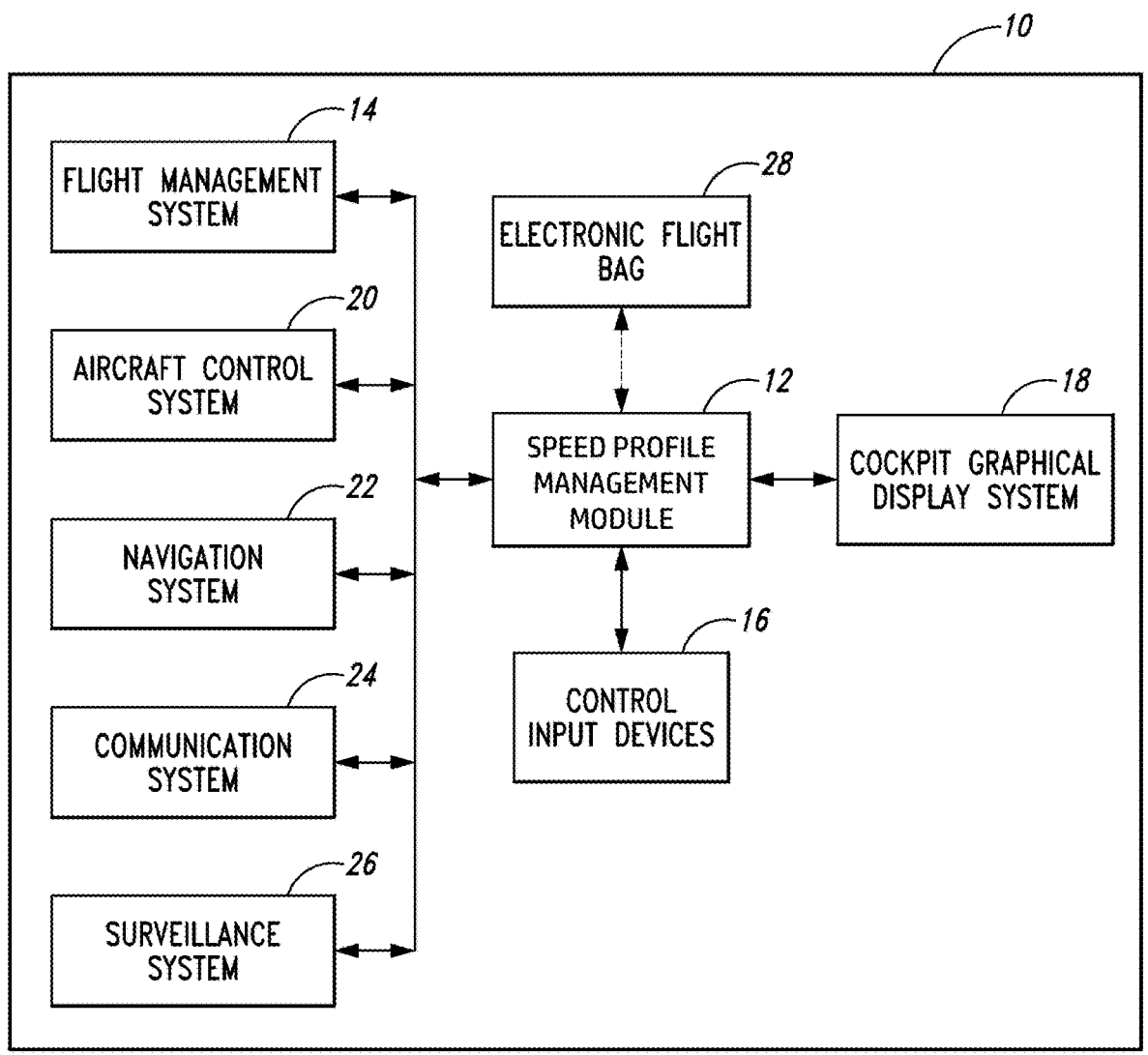
FIG. 1 is a block diagram identifying components of a generalized aircraft system in accordance with one architecture centered on a speed profile management module.

Illustrative proposed implementations of systems and methods for enabling a pilot to manage a speed profile using an interactive speed profile bar that is viewable in conjunction with a vertical situation display are described in some detail below. However, not all features of an actual implementation are described in this specification. A person skilled in the art will appreciate that during development, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A flight management system (FMS) onboard an aircraft is a specialized computer system that automates a wide variety of in-flight tasks. A primary function of a FMS is in-flight management of the flight plan. Using various sensors to determine the aircraft's position, speed, altitude and heading and an autopilot system, the FMS can guide the aircraft in accordance with the flight plan. Typically an FMS comprises a navigation database that contains the elements from which the flight plan is constructed. Given the flight plan and the aircraft's position, the FMS calculates the course to follow. The pilot can follow this course manually or the autopilot can be set to follow the course.

The flight plan includes a vertical trajectory, a lateral trajectory, time, and a speed schedule to be followed by the aircraft with respective tolerances, enabling the aircraft to reach its destination. The calculations of the flight plans are based on the characteristics of the aircraft, on the data supplied by the crew and on the environment of the system. The positioning and guidance functions then collaborate in order to enable the aircraft to remain on the trajectories defined by the FMS. The trajectories to be followed are constructed from a succession of "waypoints" associated with various flight points, such as altitude, speed, time, modes, heading, and other points. The term "waypoint" encompasses any point of interest where the point is defined using two, three or four dimensions. A trajectory is constructed from a sequence of segments and curves linking the waypoints in pairs from the departure point to the destination point. A segment or series of segments may be constrained by one or more economic constraints (e.g., time, fuel, and/or cost or a combination thereof). The speed schedule represents the speed and speed mode that the aircraft should maintain over time as it flies along the flight trajectory.

In aeronautics, the quantities used to define speed are indicated airspeed, the calibrated airspeed, true airspeed and Mach number. The indicated airspeed (IAS) is the speed corresponding to the speed indicated on the onboard instruments. The calibrated airspeed (CAS) corresponds to the speed after correction is applied to the IAS. The true airspeed (TAS) is the speed relative to the air mass the aircraft is traversing. The Mach number is the ratio of speed to the speed of sound. The value representing speed in a speed schedule can be defined as any of these speeds or can also be a groundspeed. If the time constraint is bound to an Earth-referenced point, the meeting of a time constraint is dependent on any of these speeds translated to a groundspeed, aircraft performance limitations and available distance. The groundspeed is the horizontal component of the speed of the aircraft relative to the ground. More precisely, the groundspeed is equal to the magnitude of the vector sum of the air speed and the wind speed projected onto the horizontal plane. The speed of the aircraft is the vector consisting of the wind speed and the ground speed of the aircraft.

In the interest of increased safety and improved airspace or airspace capacity, time constraints are imposed on the aircraft during all flight phases (e.g., departure, climb, cruise, descent and airport approach). This ensures that aircraft arrive at a particular point in their flight plan at a controlled arrival time, scheduled time, constrained time or required time of arrival (hereinafter "RTA"). Traditionally, most commercial aircraft have an RTA function built into the flight control systems of the aircraft. The RTA function controls the altitude and speed so that the aircraft reaches a target waypoint at an associated RTA. For example, an RTA waypoint may be a landing runway threshold, an air traffic convergence point, crossing points, etc. Ensuring an aircraft arrives at an RTA waypoint on time may make it possible, for example, to smooth the flow of air traffic before the approach phase and maintain a desired spacing between aircraft.

For instance, scheduled time(s) of arrival at certain target waypoint(s) may be established by an arrival management system for each aircraft arriving to a particular airport, so that aircraft are suitably separated in space and time between each other at each of the target waypoint(s). Scheduled time(s) of arrival may also be established by an airline operating center so that the airline orchestrates the arrivals of its flights. Furthermore, pilots themselves may schedule arrival times in some instances. For instance, they may advance arrival times in order to overcome flight delays, and so force the aircraft to adopt faster speeds.

The FMS calculates estimated fuel and estimated time of arrival (hereinafter "ETA") at an RTA waypoint, i.e., the time at which the FMS predicts that the aircraft will arrive at the RTA waypoint. If the ETA departs from the RTA by more than a predetermined tolerance, a new speed command takes place, causing the FMS to redefine the trajectory to be followed by taking account of the time constraint to be observed. The aim is to have the ETA converge with the RTA within a configurable time tolerance (e.g., ±15 seconds). This is accomplished by changing the speed of the aircraft.

Performance optimization allows the FMS to determine the best or most economical speed to fly. This is often called the ECON speed and the corresponding economy speed mode maintains the economy speed. This speed, which includes some tradeoffs between trip time and trip fuel, is based on an estimation of the time-related operating expenses that are specific to each airline's operation. The aircraft's speed while in the economy speed mode is based on an economic optimization criterion called the cost index, the weight of the aircraft, its altitude, wind and the ambient temperature. The cost index is an optimization criterion defined by the ratio of the costs of time and the costs of fuel. As a variant, the optimization criterion may take into account other costs, such as nuisance costs (noises, polluting emissions, etc.).

The cost index is the ratio of the time-related cost of an aircraft operation and the cost of fuel. The value of the cost index (CI) reflects the relative effects of fuel cost on overall trip cost as compared to time-related direct operating costs. In equation form: CI=Time cost (~$/hr)/Fuel cost (~cents/lb). Typically the flight crew enters the company-calculated cost index into a control display unit. The FMC then uses this number and other performance parameters to calculate economy (ECON) climb, cruise, and descent speeds.

Clearly, a low cost index should be used when fuel costs are high compared to other operating costs. The FMC calculates coordinated ECON climb, cruise, and descent speeds from the entered cost index. To comply with ATC requirements, the airspeed used during descent tends to be the most restricted of the three flight phases. The descent may be planned at ECON Mach/calibrated air speed (CAS) (based on the cost index) or a manually entered Mach/CAS.

A number of high-level objectives may influence speed selection during cruise flight. These objectives can be grouped into five categories: (1) maximize the distance traveled for a given amount of fuel (i.e., maximum range); (2) minimize the fuel used for a given distance covered (i.e., minimum trip fuel); (3) minimize total trip time (i.e., minimum time); (4) minimize total operating cost for the trip (i.e., minimum cost, or economy [ECON] speed); and (5) maintain the flight schedule. The first two objectives are essentially the same because in both cases the aircraft will be flown to achieve optimum fuel mileage.

In addition to one of the overall strategic objectives listed above for cruise flight, pilots are often forced to deal with shorter term constraints that may require them to temporarily abandon their cruise strategy one or more times during a flight. These situations may include: (1) flying a fixed speed that is compatible with other traffic on a specified route segment; (2) flying a speed calculated to achieve a required time of arrival (i.e., RTA) at a fix; (3) flying a speed calculated to achieve minimum fuel flow while holding (i.e., maximum endurance); and (4) when directed to maintain a specific speed by ATC.

Current aircraft operations typically employ an RTA function or a fixed speed solution that is commanded to be performed "now". While an RTA function is active, the aircraft speed will fluctuate as new estimated time predictions are made as a result of groundspeed changes. The groundspeed fluctuates with changes in wind speed. As the aircraft speed fluctuates, the thrust will vary respectively. The RTA function assigns and allows control to a waypoint in the flight plan. In other instances, air traffic controllers provide a fixed speed command. The fixed speed solution is not optimized for fuel efficiency and is applicable to a single waypoint. The fixed speeds are generated to be performed as "now" instructions, which allows an aircraft to regain a time difference.

A target waypoint and its corresponding RTA may be either manually inputted to the flight management computer of the aircraft or, alternatively, may be automatically uploaded. In each case, an RTA that is equal to the scheduled time of arrival is inputted to the FMC. In the exemplary case that the aircraft operates under the supervision of an arrival manager, the pilot is required to take necessary measures to reach each waypoint at the mandated scheduled time of arrival. For example, the trajectory may be altered by adjusting the aircraft speed, stretching the aircraft flight path, staying in a holding pattern, and so forth.

With respect to flight guidance, pilots may utilize both the flight management system and a mode control panel to manage aspects of the aircraft's flight, such as lateral profile, vertical profile, and speed profile. Input for managing these aspects may be made, for example among others, via the control display unit, the mode control panel, or other interactive means such as touch-screen or cursor-control devices. The flight guidance input may be used to control the autopilot and related systems such as flight director systems, flight control computers, and autothrottle system, which may in turn send commands to other aircraft systems such as the engines and flight control systems to direct and control the aircraft consistent with the pilots' commands.

One aspect of flight profile whose management poses a challenge is speed. The use of more efficient and more sensitive/complex navigation procedures such as required navigation performance; the availability of more options for fuel efficient, noise abatement, or throughput optimizing flight routings; and the application of automated navigation such as vertical navigation (VNAV) via autopilots to achieve fuel efficiency or required time of arrival (RTA) objectives, among others, all contribute to an increase in the need for speed management.

Throughout this disclosure, speed profile refers to the speed of the aircraft for the different phases of flight or flight segments thereof. The speed that is managed is generally the speed component of the forward velocity of the aircraft and not the vertical speed of the aircraft. The term speed refers to the airspeed of an aircraft, and the two terms, speed and airspeed, may be used herein interchangeably. Furthermore, the type of airspeed such as calibrated airspeed (CAS), indicated airspeed (IAS), Mach number, groundspeed and the like is not specifically called out as it is not critical to teaching the invention. Any type of airspeed may be displayed on a speed profile bar that is consistent with the airspeed displayed in other cockpit instruments.

Pilots may manage a number of speed constraints or aspects that may affect the speed profile of an aircraft. In addition to the aspects discussed above, particular speed constraints or inputs may include, without limitation, most economic speeds, long-range-cruise speeds, required time of arrival (RTA) speeds, company policy-based speeds, limit speeds, mode control panel speeds, crew-selected speeds, and engine-out speeds.

The combination of these various types of speed inputs can result in a complicated speed schedule that can be difficult to manage utilizing the aforementioned multiple systems currently engaged in speed profile management. The need to monitor and utilize these different systems contributes to increased workload, and potentially to errors or anomalies. There is a need for a tool that simplifies the flight crew's awareness and management of the aircraft speed profile in all phases of flight. The present disclosure addresses this need by providing systems and methods for enabling a pilot to view and manage a speed profile using an interactive speed profile bar on a vertical situation display.

FIG. 1 depicts an embodiment of a generalized aircraft system architecture 10 centered on a speed profile management module 12 (hereinafter "SPMM 12"). The term "module" as used herein, may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless telecommunications network, or the Internet.

For example, and without limitation, the SPMM 12 can be hosted on a number of on-board computers suitable for the aircraft configuration at hand, such as a dedicated speed profile management computer or a flight management computer. The SPMM 12 transmits speed profile information to the flight management system 14 and cockpit graphical display system 18, which speed profile information may have been modified, changed or updated by the flight crew using the interactive capability disclosed in some detail below. The cockpit graphical display system 18 typically includes at least a graphics processor unit (not shown) and an electronic display device (not shown).

Still referring to FIG. 1, an SPMM 12 is provided to manage the speed profile of an aircraft. From the available information in the cockpit affecting all aspects of the speed profile of the aircraft, the SPMM 12 extracts the information from the interfacing systems depicted in FIG. 1 and controls the display of symbology representing speed profile information for viewing by the flight crew on the cockpit graphical display system 18. The SPMM 12 also transmits information that has been modified, changed or updated by the flight crew using the speed profile interactive capability disclosed in more detail below, back to the systems shown in FIG. 1, to affect the speed of the aircraft.

In this regard, the aircraft flight control system 20 provides speed profile-relevant information such as the performance and health of the engines, flight control computers, autopilot and autothrust systems, and selected flight control inputs on a mode control panel of the cockpit graphical display system 18. This functionality may reside in a single computer or module or multiple computers or modules. The aircraft flight control system 20 also receives speed profile-relevant commands from the SPMM 12, the mode control panel, or other system and directs the commands to appropriate component systems, such as the autothrottle and engines, to affect the speed of the aircraft.

Figure 2:
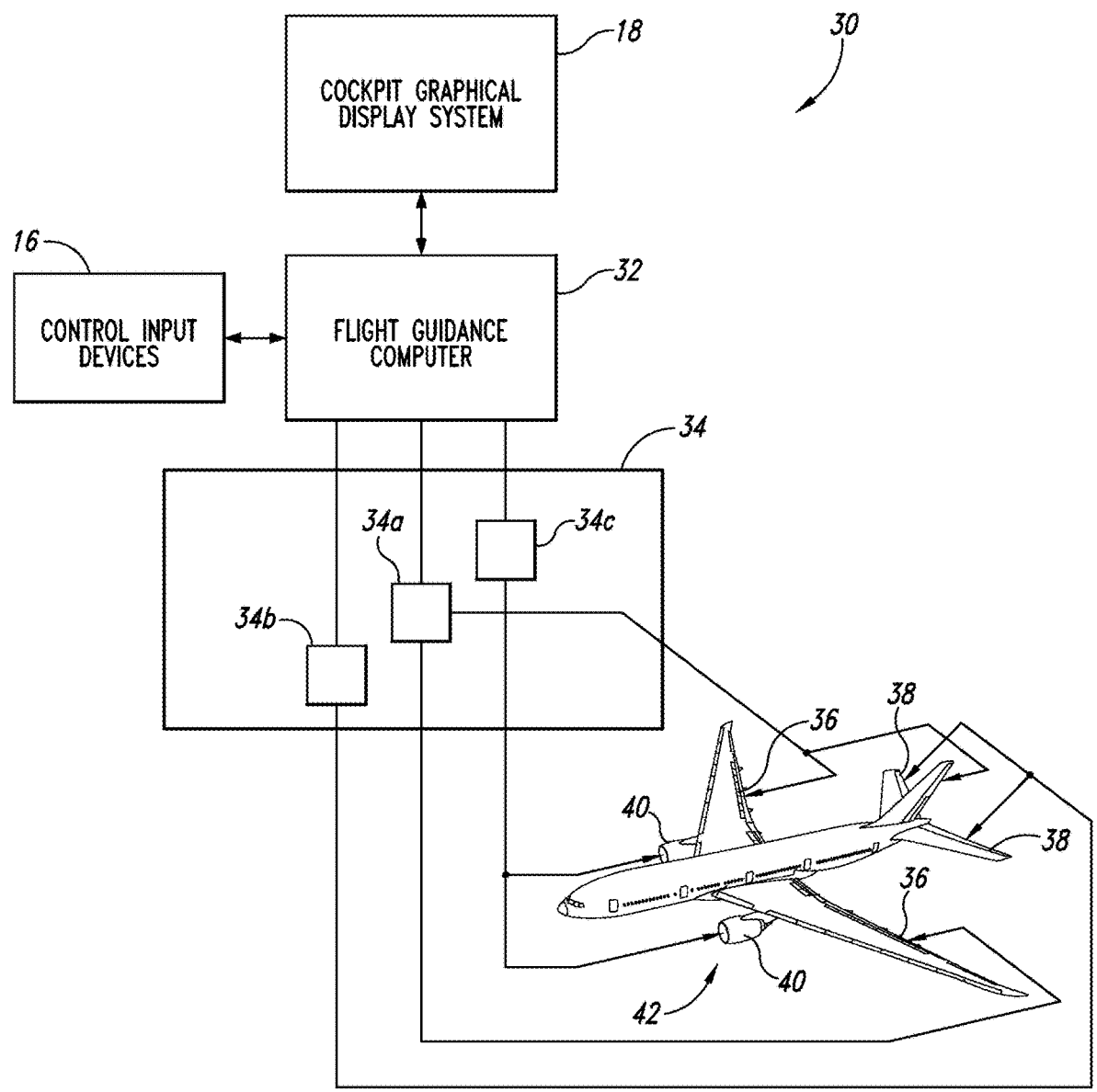
FIG. 2 is a diagram depicting an aircraft flight control architecture including a plurality of control systems.

For example, as shown in FIG. 2, a flight guidance system 30 includes display devices such as a cockpit graphical display system 18 or other annunciators (not shown), control input devices 16, a flight guidance computer 32, and a plurality of control systems 34. The flight guidance computer 32 and control systems 34 may be components of the aircraft flight control system 20 depicted in FIG. 1. In one example, the plurality of control systems 34 include a lateral/directional motion (or roll/yaw) control system 34a, a vertical motion (or pitch) control system 34b, and an airspeed (or autothrottle/engine) control system 34c. The lateral/directional control system 34a can be coupled to flight control surfaces 36 affecting lateral and directional control, which are typically ailerons and/or rudders of the aircraft 42. The vertical motion control system 34b can be coupled to pitch control surfaces 38, which are typically the aircraft's elevators. Lastly, the airspeed control system 34c can be coupled to the engines 40 of the aircraft 42 in some path-based modes of operation, and can be coupled to the elevators in some climb and descent modes of operation.

Returning to FIG. 1, the flight management system 14, and its navigation database (not shown) and aerodynamic and engine (performance) database (not shown), provide information necessary for navigation along the four-dimensional flight route for calculating the optimal or desired performance for that flight route. The flight management system 14 and its lateral and vertical navigation guidance functions may also utilize information from navigation system 22, communications system 24, and aircraft flight control system 20 and then cause the display of flight management information on the cockpit graphical display system 18.

The communications system 24 may also be enabled to uplink and downlink information, for example and without limitation, related to flight plans, ATC instructions for lateral navigation, vertical navigation, speed changes, required time of arrival at a waypoint, required time of arrival at a destination, weather, or airline operational control messages such as those related to gate information and updated time of arrival. It may also be engaged in transmitting and receiving coordination messages between aircraft that are engaged in a collaborative air traffic management application, such as where one aircraft is asked to follow another aircraft in accordance with a specified separation distance, time, speed or altitude parameter.

Another system used in managing the profile-related aspects of a flight is the aircraft's navigation system 22. The navigation system 22 may include one or more of the following component systems: a global positioning system receiver, a distance measuring equipment, an air data and inertial reference unit, ATC transponders, a traffic alert and collision avoidance system and other traffic computers used for air traffic management applications to provide speed profile-relevant information. In this regard, certain air traffic management applications may be available as part of the surveillance system 26. Alternative configurations may also embody air traffic management applications and certain navigation information in a suitably equipped electronic flight bag 28 that may interface with the SPMM 12.

In addition, control input devices 16 are provided to enter, accept, and utilize speed profile-relevant information that is available from, without limitation, a communications uplink from ATC or an airline operational center, the communication system 24, a paper chart, customized airline-specific approach procedure database, or other on-board aircraft systems such as the aircraft flight control system 20, the flight management system 14, the navigation system 22, or the surveillance system 26. The control input devices 16 may also be utilized to manage the display of information provided by the SPMM 12.

Each control input device 16 may be embodied as a dedicated control panel or as part of another control input device on the aircraft. For example, and without limitation, the control input device 16 may be integrated as part of a CDU 96 (see FIGS. 3 and 12), which incorporates a small screen and keyboard or touchscreen, or as part of another control panel for controlling flight management, navigation or display aspects of the aircraft's systems. Further, the control input devices 16 may include, without limitation, voice command input means, keyboards, cursor control devices, touch-screen input and line select keys or other keys on a CDU 96.

Figure 3:
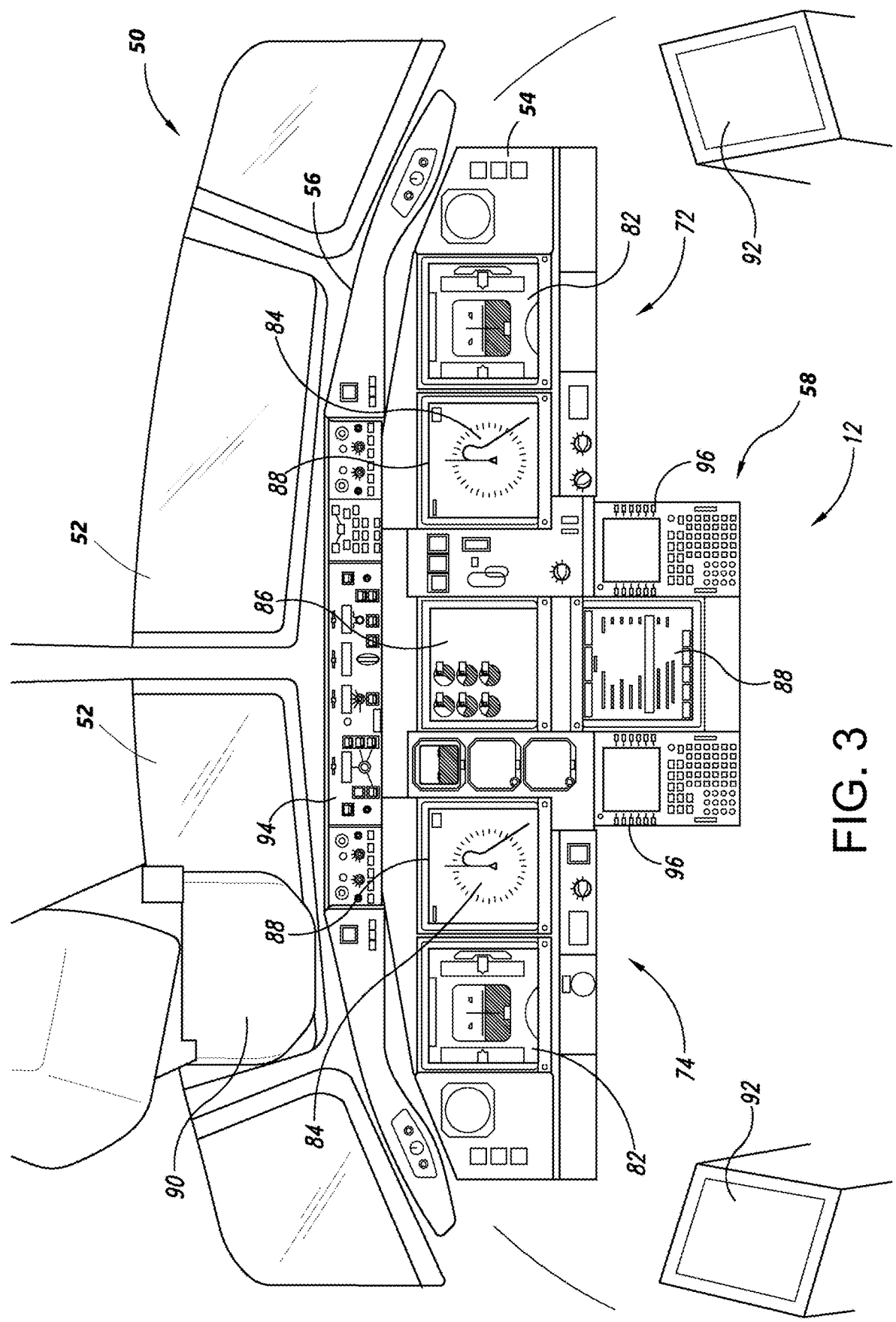
FIG. 3 is a diagram illustrating an arrangement of cockpit instruments in accordance with one proposed implementation.

FIG. 3 illustrates a general arrangement of an aircraft cockpit 50 showing a layout of many of the aircraft systems that interact with the SPMM 12. The aircraft cockpit 50 includes forward windows 52, a plurality of flight instruments on a forward instrument panel 54, a glareshield panel 56 and a control pedestal 58 with various instruments 72 and electronic display devices 74. The forward instrument panel 78 and the control pedestal 58 have a number of displays, including multifunction displays 88. As shown in FIG. 3, the electronic display devices 74 include a pair of primary flight displays 82, a pair of navigation displays 84, and a crew alerting display 86. The multifunction display 88 on the control pedestal 58 may also be configured to manage datalink communications or other cockpit functions. In addition, the cockpit has a head-up display 90, a pair of control display units 96, and a pair of electronic flight bag displays 92. In addition, a mode control panel 94 is positioned on the glareshield panel 56. The mode control panel 94, along with the control display units 96 and multifunction displays 88 with interactive capability, may be used to control or modify inputs that influence the speed profile of the aircraft.

Altitude, attitude and airspeed information is graphically displayed on the primary flight displays 82. Flight path information, heading, groundspeed, wind direction, actual aircraft position and other types of information are graphically displayed on the navigation displays 84. Each navigation display 84 allows the pilots to have a "bird's eye view" of the flight path and aircraft position. Vertical information has been incorporated into the navigation display 84 to a limited extent. While the navigation display 84 has proven to be an invaluable tool for pilots, the navigation display 84 has been supplemented by the vertical situation display, which displays the vertical flight path graphically just as the navigation display 84 shows the lateral flight path graphically. The navigation display 84 and vertical situation display (see, e.g., vertical situation display 102 in FIG. 5) may be displayed on the same multifunction display 88 or the vertical situation display may be displayed on a separate electronic display device. For example, the vertical situation display may be implemented on the flight deck as a stand-alone display system. Together, the navigational display 84 and the vertical situation display give the pilot a more complete picture of the aircraft flight path and any related hazards.

Figure 4:
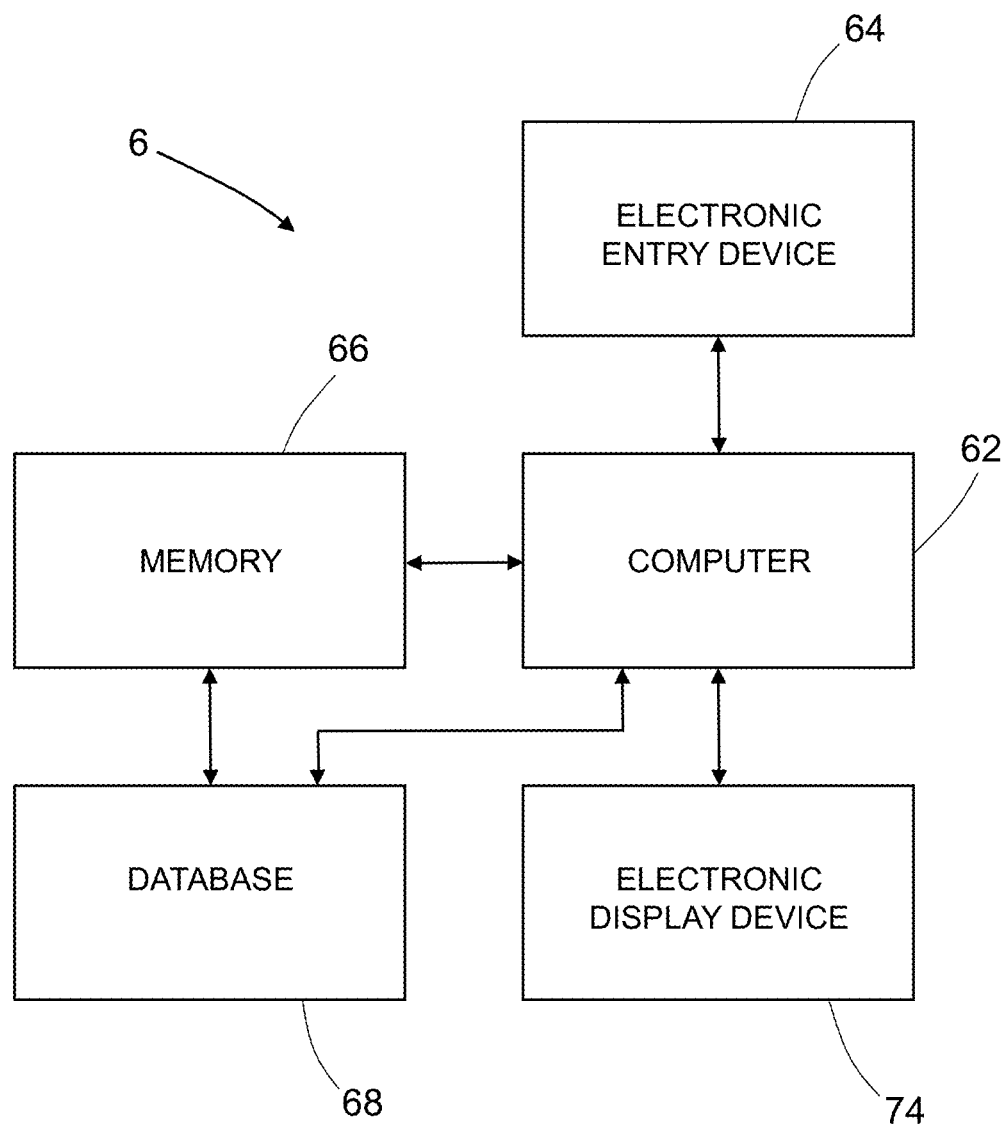
FIG. 4 is a block diagram identifying some components of a flight information display system in accordance with one proposed implementation.

FIG. 4 is a block diagram identifying some components of a flight information display system 6 which may be configured to display a vertical situation display having an interactive speed profile bar. The flight information display system may consist of existing components on a flight deck configured (e.g., arranged and programmed) to perform the functions disclosed herein. In the alternative, the flight information display system 6 may be a portable system (e.g., a laptop or tablet computer) that can be carried on and off the aircraft by the flight crew.

The flight information display system 6 depicted in FIG. 4 includes a computer 62, an electronic entry device 64 and an electronic display device 74. The computer 62 is configured to cause the electronic display device 74 to present a vertical situation display that includes symbology representing aircraft vertical positions (e.g., altitudes) for a planned flight path and symbology (e.g., in the form of a speed profile bar) representing speed profile information associated with the planned flight path. The electronic entry device 64 may be used for user inputs. The user may also input information into the flight information display system 6 via other aircraft systems. For example, the user may use a flight management computer (not shown in FIG. 5, but see flight management computer 108 in FIG. 11) to input information and preferences into the flight information display system 6. The computer 62 includes a memory 66 (also referred to herein as a "a non-transitory tangible computer-readable storage medium"), which stores a database 68. The database 68 may include information on terrain, airspace, flight routes, flight plans, waypoints, instrument approaches, runways and/or any other information that may be needed by an aircraft flight crew. The computer 62 is programmed to use at least some of the information from the database 68 to generate a side view of an aircraft flight plan (e.g., a vertical situation display) on an electronic display device 74.

A vertical situation display graphically represents a view of the vertical (altitude) profile of an aircraft 42. One type of vertical situation display depicts a swath that follows the current track of the aircraft 42 and therefore is referred to as a track-type vertical situation display. When selected by the flight crew, the vertical situation display may, for example, appear at the bottom of the navigation display 84. The basic features of this type of vertical situation display include altitude reference and horizontal distance scales, an aircraft symbol, a vertical flight path vector, terrain depiction, glideslope depiction, and various information selected by the flight crews and flight management computer 108, such as the mode control panel-selected altitude, minimum decision altitude, and selected vertical speed predictor. The vertical situation display remains stable during dynamic conditions.

Additional features can be added to the vertical situation display. One example is the depiction of the vertical profile along the entire planned flight path, which vertical profile is referred to as a path-type vertical situation display. Showing the vertical swath along the planned flight path of the aircraft 42, instead of just along the current track, provides several benefits. Not only may this enhance awareness of the vertical mode, but VNAV and lateral navigation concepts also may be simplified for training. Other envisioned enhancements include providing weather and traffic information.

Figure 5:
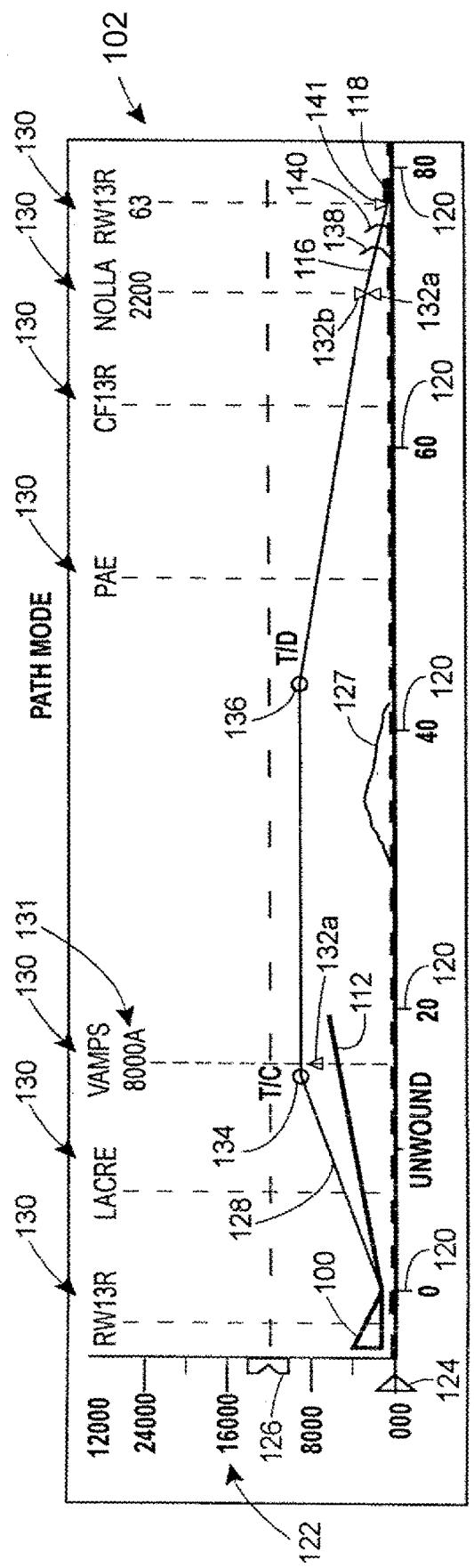
FIG. 5 is a diagram representing a vertical situation display in a path mode.

FIG. 5 shows a typical side-looking vertical situation display 102 that includes an aircraft symbol 100, a straight line representing a projected flight path 112, and a chain of connected straight lines representing a planned vertical profile 128. A green dot 114 represents an estimate of a location where the aircraft will reach a target speed. A straight line 116 representing a glideslope is displayed adjacent to a runway symbol 118. Distance is shown on a scale having distance marks 120. An altitude scale 122 is shown for altitude reference. A decision height reference 124 may be selectable and generally set to a decision height for an instrument approach. An altitude reference "bug" 126 may also be selectable. The vertical situation display 102 may also show basic aircraft information. Limited terrain information 127 may also be shown within a corridor about the projected flight path 112.

FIG. 5 shows the vertical situation display 102 in a path mode of operation. The planned vertical profile 128 is graphically displayed, which may be useful in flight planning. Various waypoints along the planned vertical profile 128 are indicated by waypoint name indicators 130. The lines representing the planned vertical profile 128 depict the planned altitudes as a function of range (distance) from the current location of the aircraft. The terrain information 127 displayed is based on the planned vertical profile 128. The corridor used for determining terrain information 127 may be based on the actual flight plan route. This gives pilots an accurate representation of the terrain at each point in the flight, including compensating for changes of direction during the flight.

The path mode may include display of a top-of-climb point 134, a top-of-descent point 136 and/or any other path-based symbology from the navigation display. The top-of-climb point 134 and top-of-descent point 136 may be useful in flight planning, especially in determining whether the aircraft will be able to make an altitude restriction which may be shown as one or more altitude restriction triangles 132a and 132b. The numerical representation of an altitude restriction 131 is shown under the waypoint named VAMPS. The altitude restriction triangle 132a with an apex pointing up represents an at-or-above altitude restriction. The altitude restriction triangle 132b with an apex pointing down represents an at-or-below altitude restriction. Two altitude restriction triangles together 132a and 132b with apexes that touch, one pointing up and one pointing down, represent a hard altitude restriction.

The path mode also may include a display of instrument approach information, for example, straight line 116 representing a glideslope. A 1000-foot decision gate 138 and a 500-foot decision gate 140 may also be shown, which correspond to decision gates regularly used by pilots to determine whether the approach will be continued.

The vertical situation display 102 helps to prevent controlled flight into terrain and approach and landing accidents by enhancing the flight crew's overall situation awareness. In addition, the vertical situation display 102 is designed to reduce airline operating costs by decreasing the number of missed approaches, tail strikes, and hard landings and by reducing vertical navigation training time.

Figure 6:
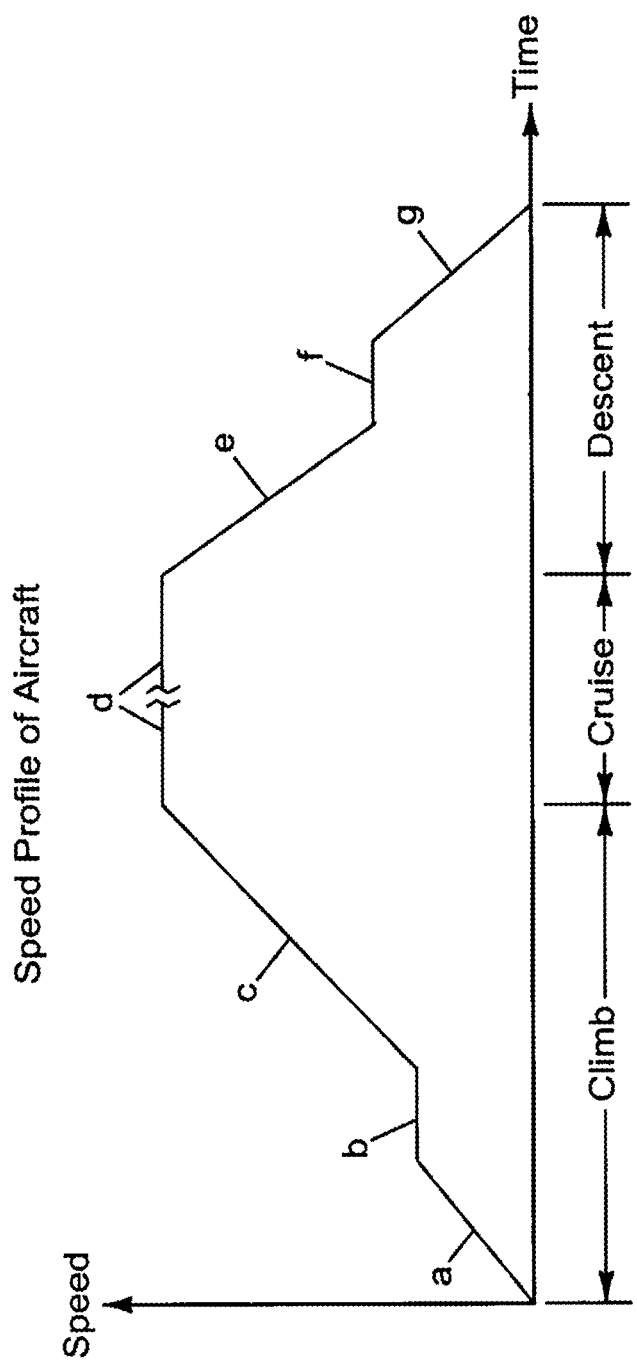
FIG. 6 is a graph representing a simplified preprogrammed speed profile for a flight path of an aircraft.

This disclosure proposes to enhance the utility of a vertical situation display by configuring an electronic display device 74 to display speed profile information associated with the planned vertical profile 128. FIG. 6 is a graph representing a simplified preprogrammed speed profile for a flight path of an aircraft. The flight path includes a climb segment, a cruise segment and a descent segment, where the preprogrammed speed profile monotonically increases during the climb segment, levels off at a desired cruise speed, and then monotonically decreases during the descent segment. The adverb "monotonically" as used herein means that there are a series of successive speed increases or successive speed decreases, without substantial oscillation in the relative value of the speed during the segment.

Speed increases during the climb segment and speed decreases during the descent segment may be limited by certain constraint speeds. Such constraint speeds are often set by law for aircraft flying below a certain elevation, such as, for example, a law requiring a plane to fly at 250 knots or less under 10,000 feet. Such a constraint speed would limit the climb speed to 250 knots or less at elevations of 10,000 feet or below during climb and descent segments. Thus, during the climb segment, as illustrated in FIG. 6, the aircraft may accelerate to a speed of 250 knots during portion a, then maintain a constant speed of 250 knots during portion b, until the aircraft reaches 10,000 feet. At that point, the aircraft may begin to accelerate again during portion c of the climb segment. The cruise segment is indicated by portion d in the graph of FIG. 6. During the descent segment, the aircraft may decrease speed during a portion e in order to comply with the constraint speed of 250 knots at 10,000 ft, then maintain the 250 knots for a period of time during portion f of the speed profile, before reducing speed again during portion g, as the aircraft begins final approach.

The preprogrammed speed profile of FIG. 6 is a simplified profile for illustrative purposes. An actual preprogrammed speed profile may contain any number of suitable constraint speeds. For example, in addition to constraint speeds imposed by law, there may be other constraint speeds imposed for achieving a desired purpose, such as to optimize fuel use during the flight and/or to optimize flight time, or for safety purposes. In some embodiments, constraint speeds are stored in a database as constants, which can be changed if, for example, air traffic regulations change. In addition, certain users, such as airline administrators, can select customized constraint speeds. Constraint speeds may be applied during any segment of the flight path. For example, while FIG. 6 illustrates a constant cruise speed, constraint speeds may cause preprogrammed changes in speed during the cruise segment.

The innovative graphical user interface (GUI) technology disclosed herein is configured to concurrently present a vertical situation display and an interactive speed profile bar. More specifically, the GUI includes interactive speed profile bar software configured to enable a pilot to input speed profile changes into a speed profile management module. The interactive speed profile bar includes a multiplicity of virtual buttons of variable width, referred to hereinafter as "speed bar buttons". Each speed bar button corresponds to a respective speed segment to be flown by the aircraft when the aircraft is flying in a respective speed mode. The vertical situation display range (and concurrently displayed speed profile bar) may be adjusted to display speed bar buttons corresponding to all or less than all speed segments (and concurrently displayed vertical profile segments) for a particular flight plan.

When the pilot selects a particular speed bar button, symbology representing various available speed segment options is displayed in any one of many possible graphical user interface formats, such as a drop-down list, a dialog box, an array of exclusive selector buttons (virtual), and so forth. The pilot may then select one of the available speed segment options. The speed profile stored in a non-transitory tangible computer-readable storage medium is then updated to incorporate the newly selected speed mode. The pilot or autopilot will then fly the aircraft at the speeds specified by the updated speed profile. It is possible also to manipulate a down path speed segment using the speed bar, not just the active speed. Depending on the speed change, it may only last until the next speed change/inflection point.

Graphical user interface technology designed to enable a pilot to modify the current speed profile while viewing a vertical situation display will now be described in some detail with reference to FIGS. 7A-7E, which show aspects of one proposed implementation of a display system configured to concurrently present a vertical situation display 102 and an interactive speed profile bar (hereinafter "speed profile bar 150"). The speed profile bar 150 has operator-activatable graphical display elements which are correlated to respective speed segments of the currently active speed profile. In the context of the computerized cockpit display system disclosed herein, each graphical element has associated stored digital data (e.g., a data object in object-oriented programming) representing an identifier (name) and associated parameter values for a corresponding speed segment in a succession of speed segments that make up the speed profile.

Figure 7A:
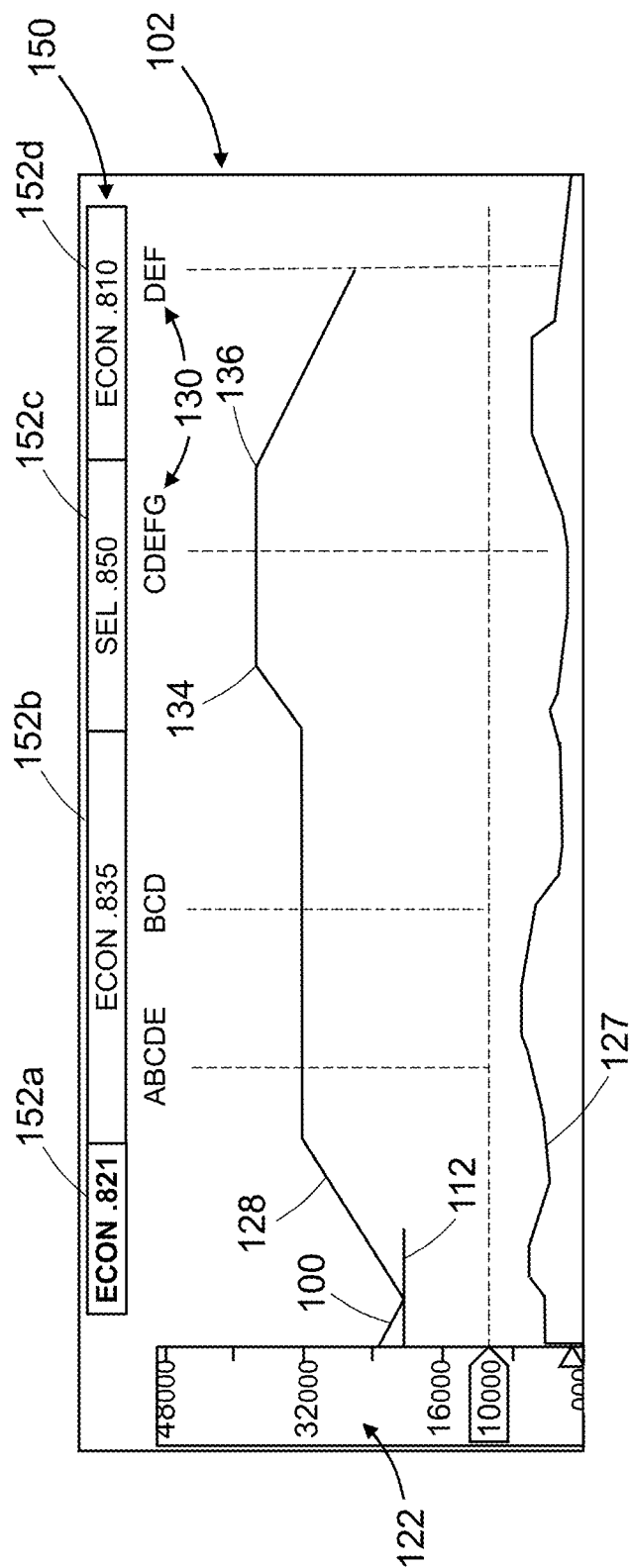
FIGS. 7A through 7E are diagrams representing successive example screenshots of a vertical situation display having an interactive speed profile bar with variable-width speed bar buttons corresponding to respective speed segments of the speed profile, which interactive speed profile bar may be used to access a menu of pilot-selectable speed segment options.

FIG. 7A is a diagram representing a vertical situation display 102 in accordance with one proposed implementation at an instant in time when the pilot has not yet interacted with the speed profile bar 150. In addition to the known elements of a typical vertical situation display described above with reference to FIG. 5, the vertical situation display 102 depicted in FIG. 7A includes a speed profile bar 150, which is a graphical user interface the pilot can interact with for the purpose of modifying or adjusting the current speed profile. The speed profile bar 150 shows changes to the speed profile which are planned to occur along the vertical profile, the location of each speed mode change on the display being correlated with the planned horizontal position of the aircraft at the time of the speed mode change.

As previously mentioned, the interactive speed profile bar 150 consists of a multiplicity of operator-activatable graphical display elements. The term "operator-activatable display element" refers to display elements that are selectable and/or modifiable via a control input device by, for example, touch interface or aligning a cursor with the operator-activatable element and entering a keystroke, mouse click, or other appropriate signal. Those skilled in the art would understand how operator-activatable elements function; a more detailed description may also be found in U.S. Pat. No. 7,418,319, entitled "Systems and Methods for Handling the Display and Receipt of Aircraft Control Information".

In accordance with the proposed implementation schematically depicted in FIG. 7A, the operator-activatable display elements of the interactive speed profile bar 150 take the form of virtual speed bar buttons 152a-152d of variable width arranged end to end in a row, each speed bar button displaying a respective label identifying a respective speed segment. More specifically, the capital letters in each label identify the speed mode scheduled to be active during the corresponding leg of the flight having the vertical profile depicted below the speed profile bar 150 on the vertical situation display 102. The numerical portion on the display represents the actual speed target in calibrated airspeed (CAS) or, when displayed with a decimal point, the speed target in Mach number for the identified speed mode. In the instance depicted in FIG. 7A, the interactive speed profile bar 150 includes the following speed bar buttons: speed bar button 152a displaying the label "ECON 0.821"; speed bar button 152b displaying the label "ECON 0.835"; speed bar button 152c displaying the label "SEL 0.850"; and speed bar button 152d displaying the label "ECON 0.810".

As seen in FIG. 7A, the widths (hereinafter "button widths") of speed bar buttons 152a-152d are variable. More specifically, the button widths of the speed bar buttons 152a-152d vary as a function of the range (distance to be flown) for the corresponding speed segment of the speed profile. For example, if the aircraft were scheduled to fly for 100 miles at an ECON speed of 0.821 (identified in speed bar button 152a) and then fly 200 miles at an ECON speed of 0.835 (identified in speed bar button 152b), then the speed bar button 152a would have a button width W, whereas the speed bar button identifying the ECON speed mode would have a button width 2W. In other words, the button widths of the speed bar buttons 152a-152d are correlated to the respective ranges of the speed segments of the current speed profile being identified in the speed profile bar 150.

Figure 7B:
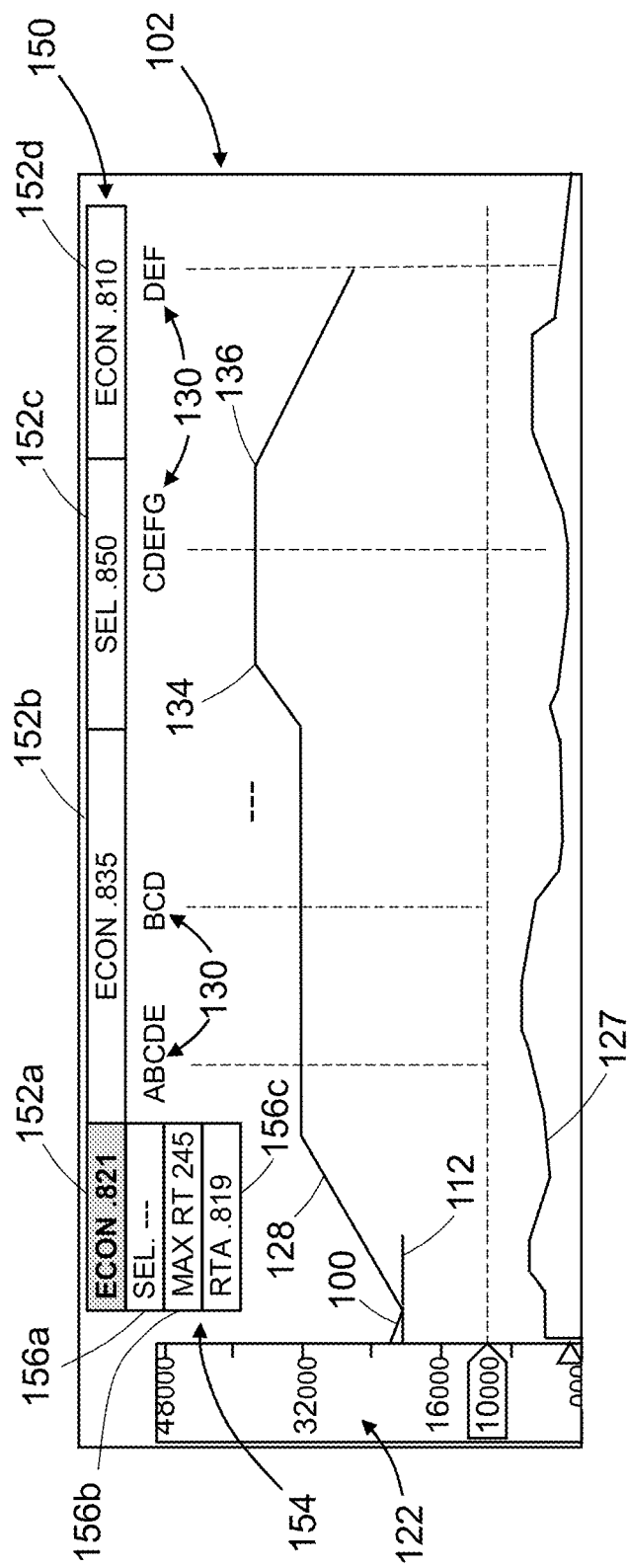

In FIG. 7A, the alphanumeric symbology depicted in speed bar button 152a is boldfaced to indicate that the aircraft is currently flying in the ECON speed mode with a target speed of Mach 0.821. In FIG. 7B, the speed bar button 152a is shaded to indicate that speed bar button 152a has been selected by the pilot. For example, the pilot may make the selection by touching the speed bar button 152a. The speed bar button may change color when selected, which change in color is indicated by the aforementioned shading in FIG. 7B. For example, the speed bar button 152a may become green with a magenta outline to indicate pilot selection.

In response to pilot selection of speed bar button 152a, a drop-down list 154 is overlaid on a portion of the vertical situation display 102 for the pilot to interact with. A drop-down list (also known as a drop-down menu, pull-down list and picklist) is a graphical control element that allows the user to choose one entry from a list of entries. In the example depicted in FIG. 7B, the drop-down list 154 includes the following elements: a select speed entry field 156a identifying a SEL speed mode having a fillable target speed field (which the pilot may use to select a specific target speed); a maximum-rate-of-climb entry 156b identifying a step climb speed mode in which the maximum rate of climb is 245 feet per minute; and an RTA entry 156c identifying an RTA speed mode having a target speed of Mach 0.819.

In accordance with an alternative embodiment, the drop-down list 154 may contain exclusive selector buttons (described below with reference to FIG. 14). The items in the drop-down list 154 may be selected by touch or with a cursor control device (e.g., of a type depicted in FIGS. 13A and 13B) by pushing a select button while the item is highlighted. The drop-down list 154 may stay open after an item has been selected to allow other another item to be selected (which has the effect of de-selecting the initially selected entry). The drop-down list 154 may be closed by selecting the speed bar button 152a again, selecting an EXIT button at the bottom of the list (not shown in FIG. 7A), executing the change (not shown in figure), or any other suitable GUI interaction.

Figure 7C:
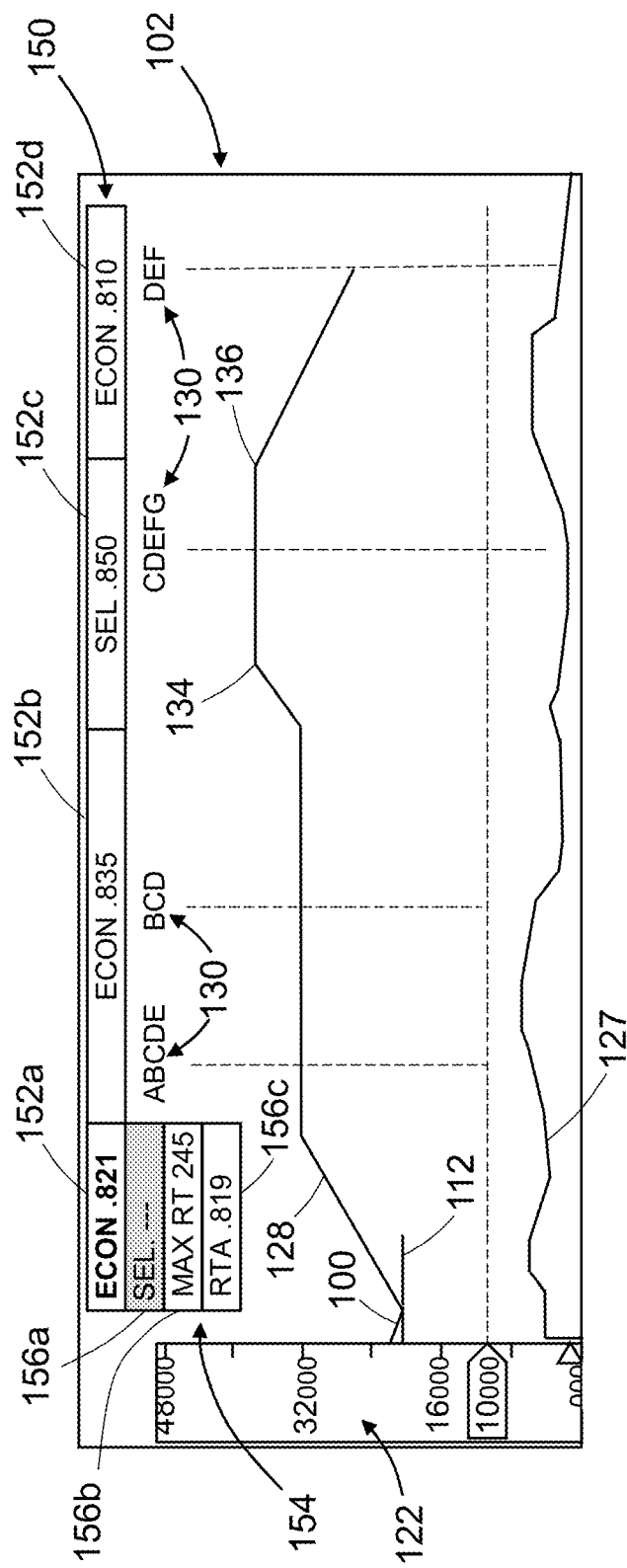
Figure 7D:
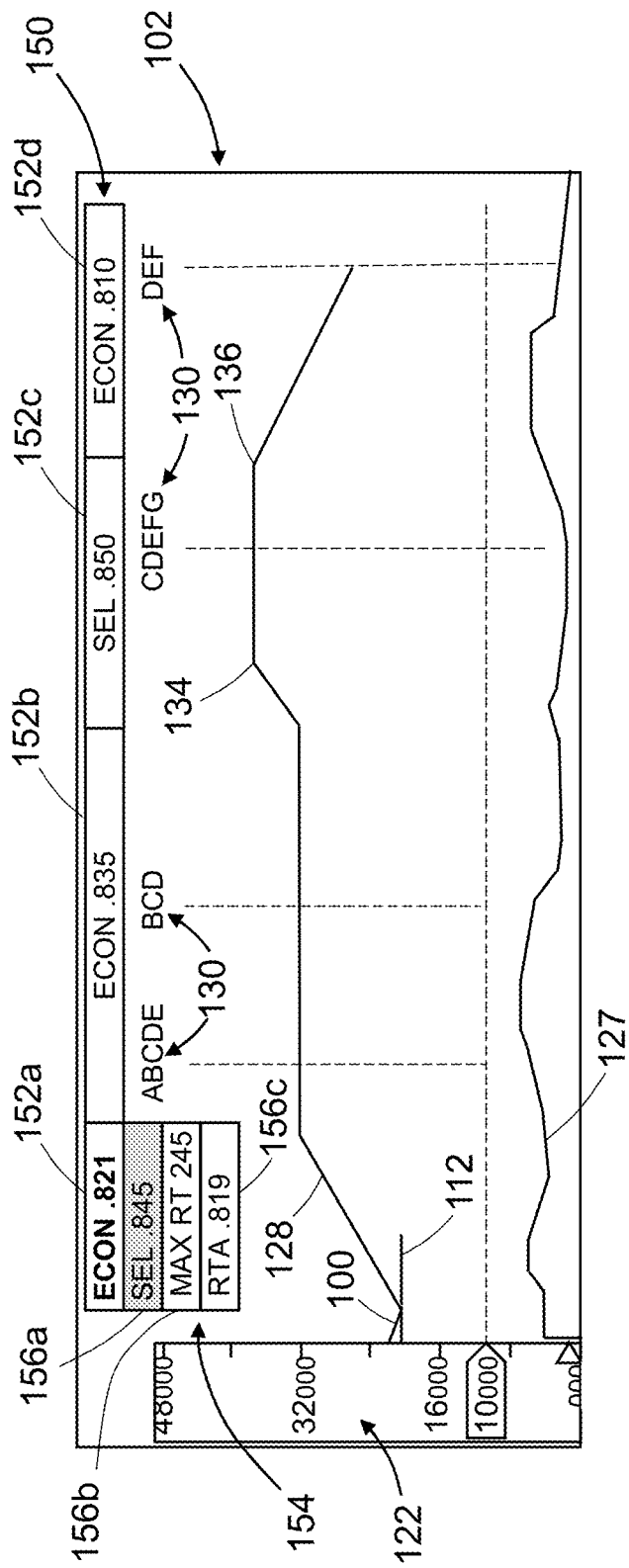
Figure 7E:
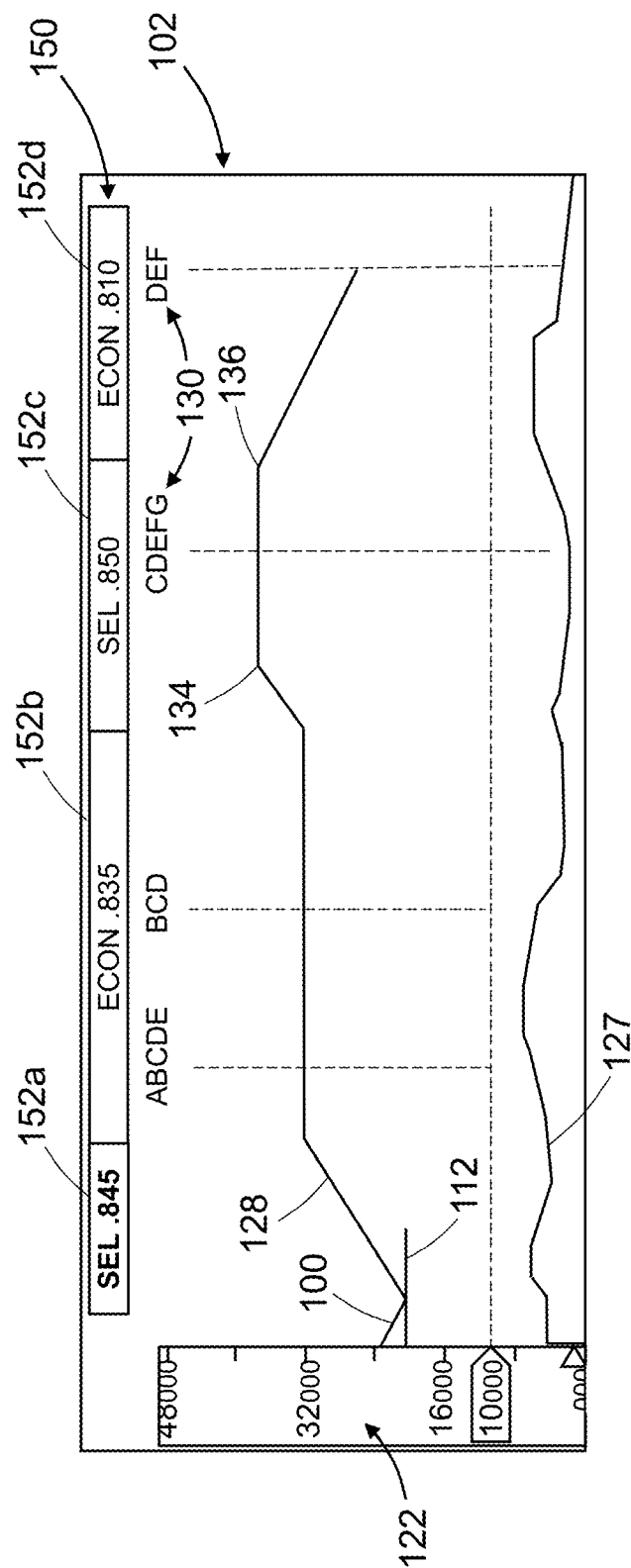

In FIG. 7C, select speed entry field 156a of drop-down list 154 is shaded (again representing a color change) to indicate that select speed entry field 156a has been selected by the pilot. The interactive speed profile bar software is configured such that the pilot may then enter a numeric value (e.g., using numeric keys on a CDU 96, or other keyboard) specifying a pilot-selected target speed for the aircraft. FIG. 7D shows the state of the drop-down list 154 after the pilot has input a target speed of Mach 0.845. Following a further input to the CDU 96 (see FIG. 3) or other input device, the drop-down list 154 disappears and alphanumeric symbology representing the selected speed mode and target speed (in this example, "SEL 0.845") is displayed in the speed bar button 152a, as depicted in FIG. 7E. The pilot or autopilot will thereafter fly the aircraft in a manner that achieves the selected target speed during that speed segment.

The width of a speed bar button 152 will be referred to herein as the "button width". The button widths of the speed bar buttons 152 vary as a function of the range during each speed segment of the currently enabled speed profile. The respective widths of the speed bar buttons to be displayed are calculated by the interactive speed profile bar software, which is also configured to impose a minimum button width constraint.

FIGS. 8A through 8D are diagrams representing successive example screenshots of a vertical situation display 102 having an interactive speed profile bar 150 with variable-width speed bar buttons. In the instance depicted in FIG. 8A, the interactive speed profile bar 150 includes the following speed bar buttons: a special speed bar button 152e having symbology indicating that other symbology identifying multiple speed segments is available for viewing; speed bar button 152f displaying the label "SEL 0.845"; speed bar button 152g displaying the label "SEL 0.850"; and speed bar button 152h displaying the label "ECON 0.835". The symbology displayed in special speed bar button 152e consists of ellipses. However, any other predefined symbology may be employed to indicate additional information is available. Each of the speed bar buttons depicted in FIG. 8A has a button width equal to or greater than the minimum button width. The minimum button width remains constant, but the range scale of the vertical situation display 102 may be varied (the altitude scale typically adjusts based on the range scale). This gives rise to the circumstance that the range represented by the minimum button width (hereinafter the "threshold range") changes as the range scale changes. In other words, the interactive speed profile bar software makes use of a parameter name "threshold range" which has a value which varies in dependence on the range scale of the vertical situation display 102.

Figure 8A:
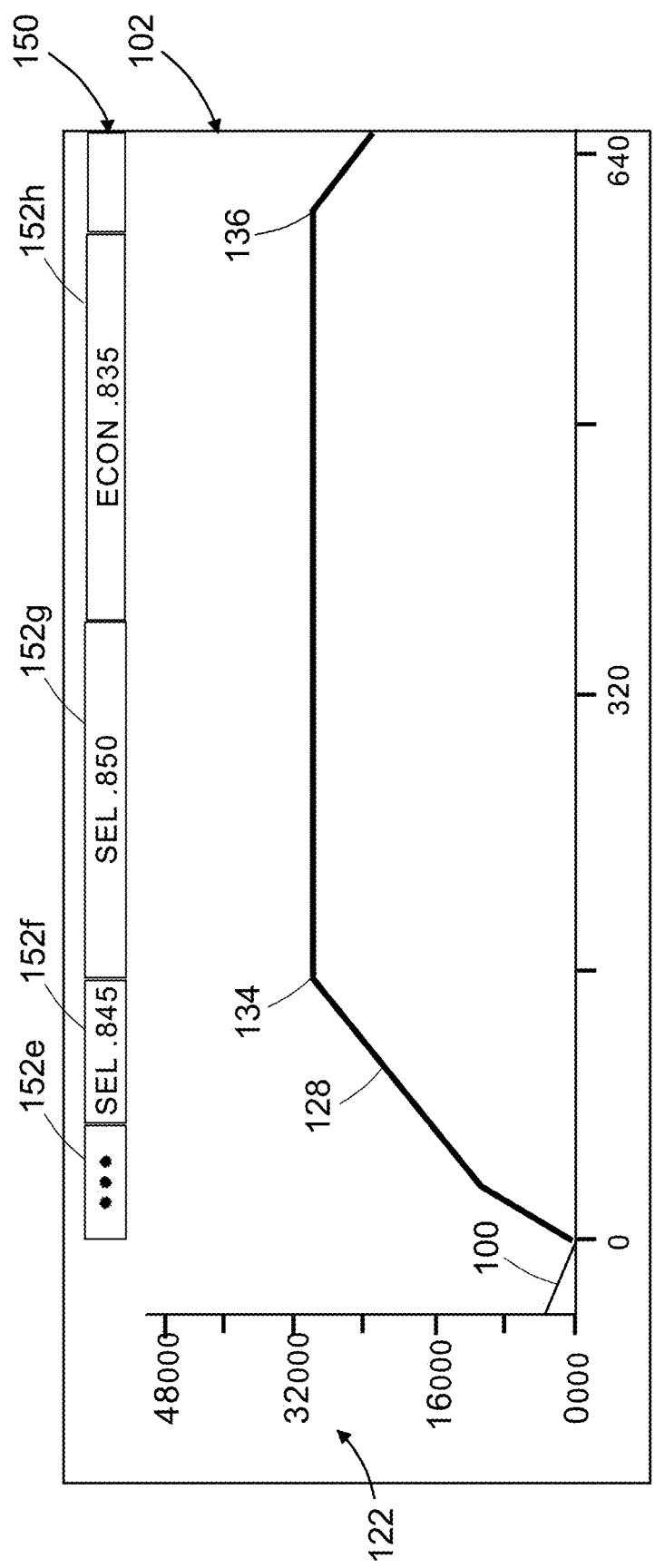
FIGS. 8A through 8D are diagrams representing successive example screenshots of a vertical situation display having an interactive speed profile bar with variable-width speed bar buttons corresponding to respective speed segments of the speed profile, which interactive speed profile bar includes GUI elements for speed bar button decluttering.
Figure 8B:
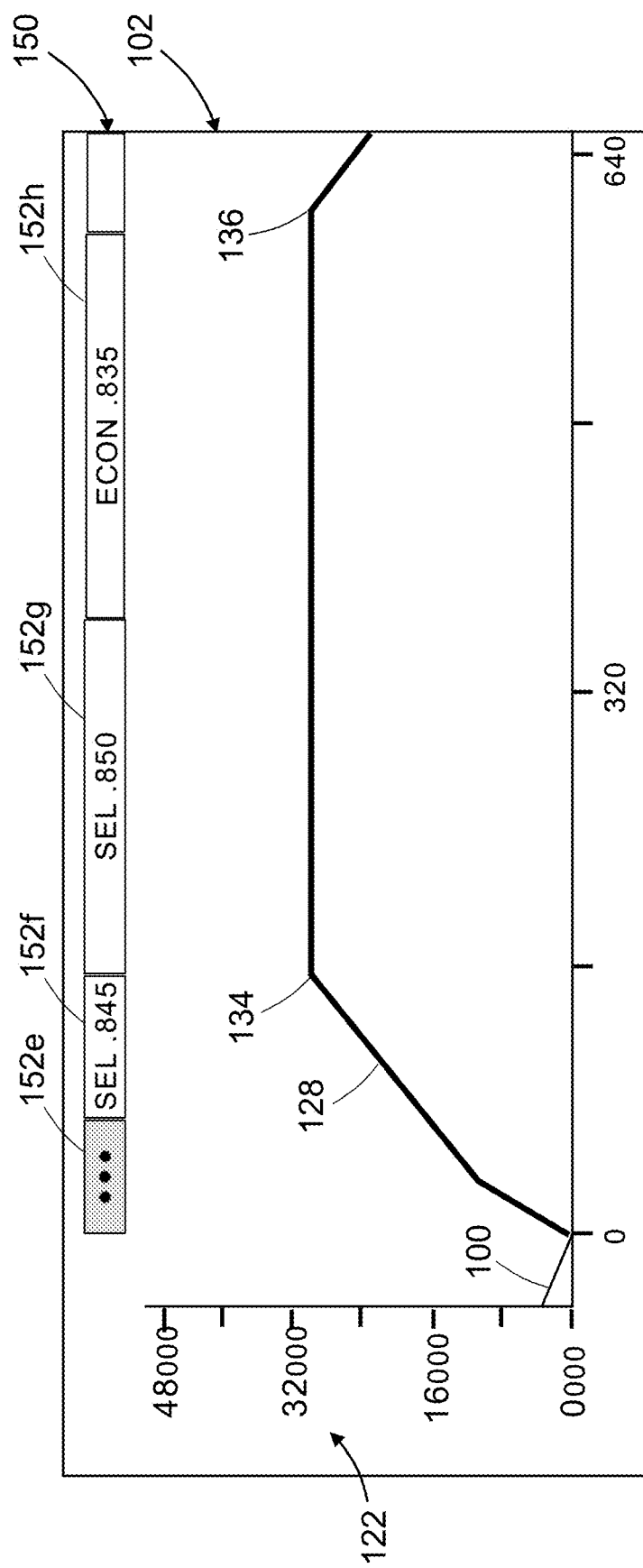
Figure 8C:
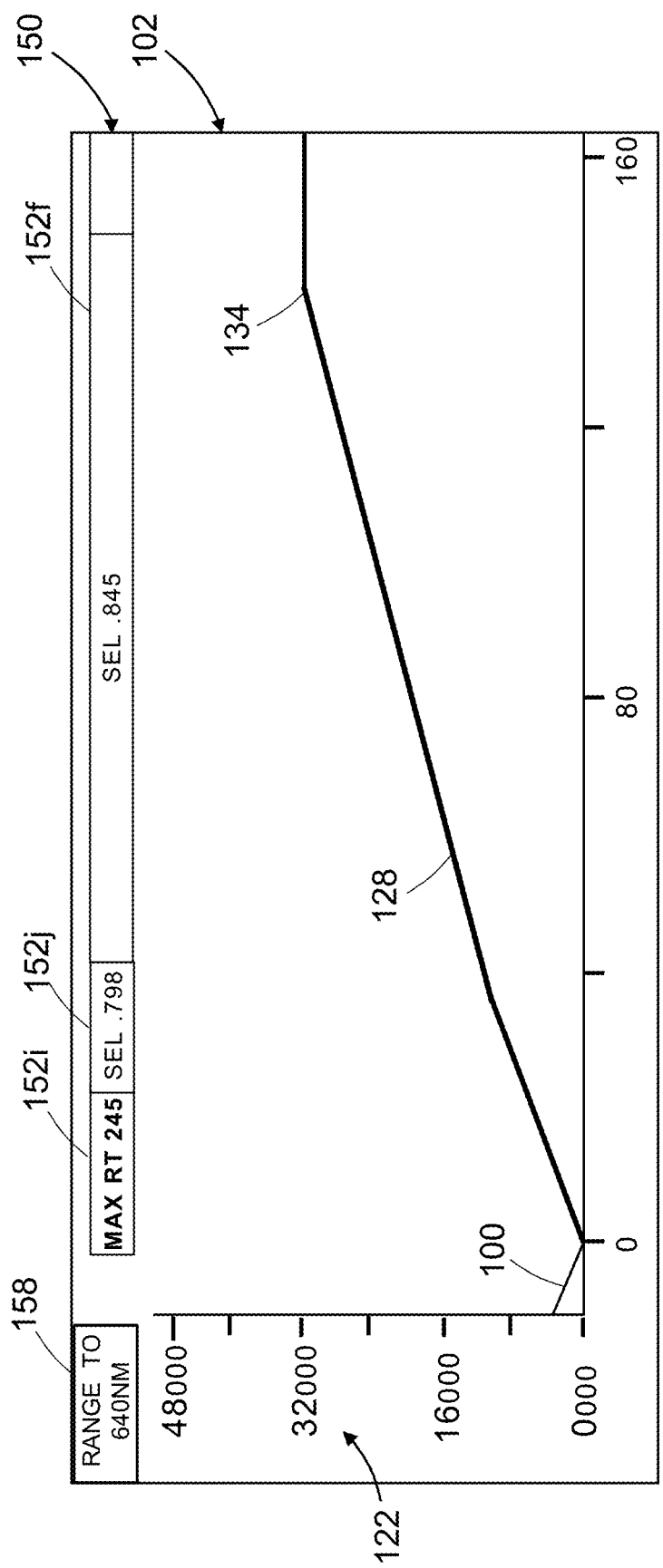
Figure 8D:
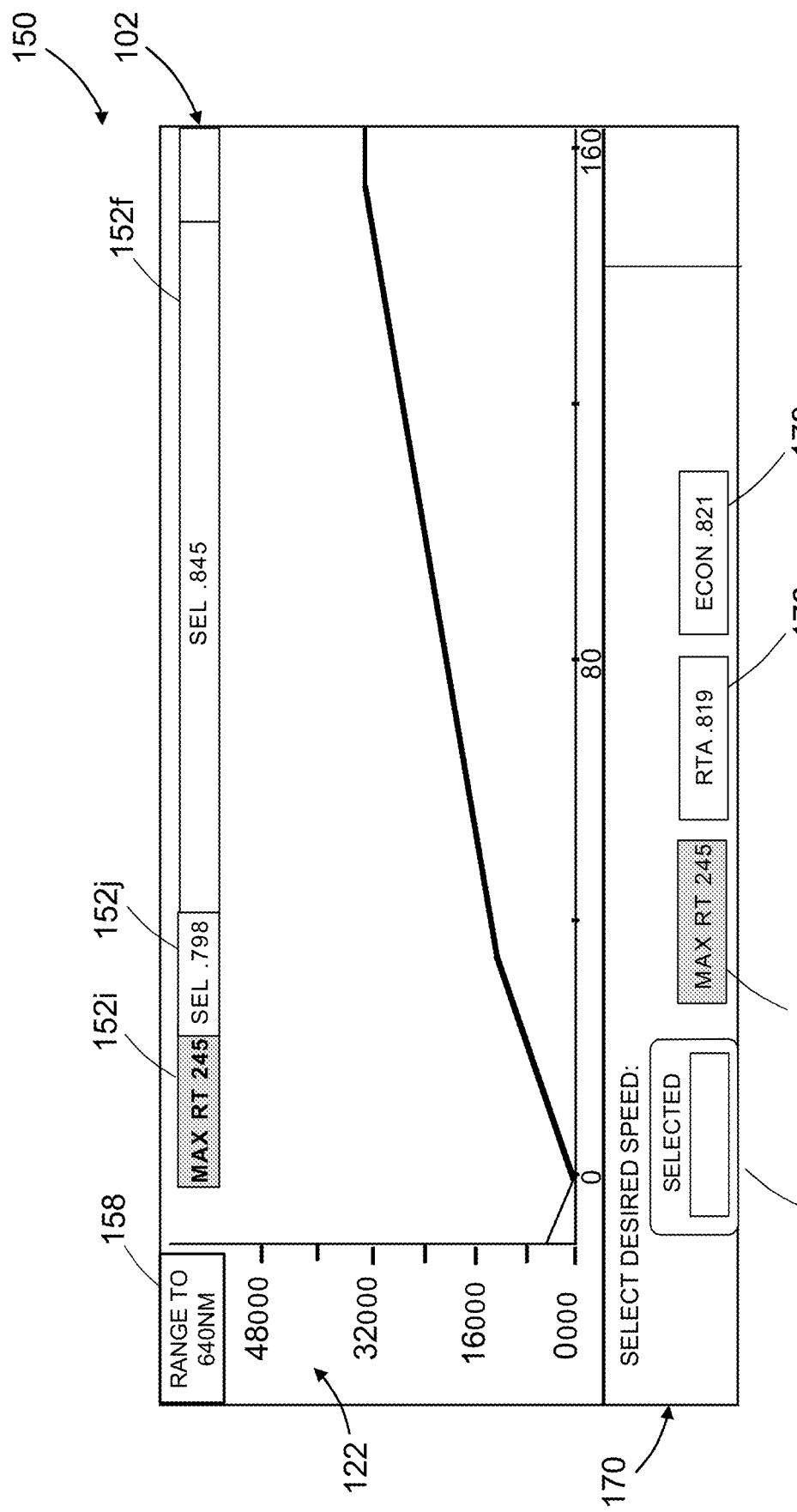

For example, the range scale is adjustable by the pilot. As used herein, adjusting the range scale means changing the scale of the horizontal axis of the vertical situation display 102 so that a shorter or longer total range is displayed along the horizontal axis. For example, instead of the virtual situation display 102 depicting the planned vertical profile for the next 640 miles to be flown by the aircraft (as seen in FIGS. 8A and 8B), only the portion of the planned vertical profile for the next 160 miles is depicted along the same horizontal axis (as seen in FIGS. 8C and 8D). This change results in a more zoomed in range scale.

In the vertical situation display 102 with interactive speed profile bar 150 disclosed herein, the length of the speed profile bar and the length of the horizontal axis of vertical situation display 102 are equal when displayed on the same screen. Thus the speed profile bar 150 represents that portion of the speed profile that will govern the speed of the aircraft as the aircraft flies the total range represented by the horizontal axis. This means that, if the minimum button width is a unit length along the speed profile bar 150, then there is a unit length of range (referred to herein as the "threshold range") corresponding to the minimum button width. (That threshold range will vary as the range scale is varied.)

A spatial display restriction arises when the current speed segment being flown by the aircraft has a range which is less than the threshold range. Any attempt to display a speed bar button having a width corresponding to that range would be blocked by the imposition (by an algorithm of the interactive speed profile bar software) of the minimum button width constraint. More specifically, the interactive speed profile bar software identifies instances wherein speed bar buttons corresponding to short-range speed segments (speed segments having a range less than a settable threshold range) cannot be displayed because their widths would not meet the minimum button width constraint. In response to a determination that the current range is less than the threshold range, the interactive speed profile bar software is configured to cause the display of a special speed bar button 152e that does not identify a specific speed segment and instead displays symbology indicating that other symbology identifying multiple speed segments is available for viewing.

To resolve instances wherein speed segments cannot be identified on the speed profile bar 150 because their ranges are less than the threshold range, means for speed bar button decluttering are provided which enable a pilot to view speed bar buttons identifying speed segments having ranges less than the threshold range. This is accomplished by automatically adjusting the zoom level of the range scale of the vertical situation display 102 (see change in the range scale by first viewing FIG. 8B and then viewing FIG. 8C) in response to the pilot selecting the special speed bar button 152e. This change in the range scale produces an inversely proportional decrease in the threshold range corresponding to the fixed minimum button width. A speed segment having a range greater than the decreased threshold range (which range was previously less than the initial threshold range) may now be identified by its own speed bar button having a button width proportional to the range of the speed segment.

In FIG. 8B, the special speed bar button 152e is shaded to indicate that special speed bar button 152e has been selected by the pilot. For example, the pilot may make the selection by touching the special speed bar button 152e. The special speed bar button 152e may change color when selected, which change in color is indicated by the aforementioned shading in FIG. 8B. For example, the color of special speed bar button 152e may change to green with a magenta outline to indicate pilot selection.

In response to pilot selection of special speed bar button 152e, the scale of the horizontal axis of the vertical situation display 102 is reduced so that a shorter range is displayed along the horizontal axis. For example, instead of the virtual situation display 102 depicting the planned vertical profile for the next 640 miles to be flown by the aircraft (as seen in FIG. 8B), only the portion of the planned vertical profile 128 for the next 160 miles is depicted along the same horizontal axis (as seen in FIG. 8C). In addition, a return-to-previous-range button 158 is displayed (see upper left-hand corner of the screenshot presented in FIG. 8C), which the pilot can touch or click on to restore the previous scale of the horizontal axis of the vertical situation display 102.

At the same time (also in response to pilot selection of special speed bar button 152e), the displayed speed profile bar 150 is reconfigured such that the following changes occur: (1) the width of the speed bar button 152f is expanded and relocated to conform to the change in range scale; (2) the special speed bar button 152e is removed; and (3) two new pilot-activatable speed bar buttons 152i and 152j are displayed, each of the speed bar buttons 152i and 152j having a respective button width equal to or greater than the minimum button width and reflecting their respective speed segment range. Thus, in the instance depicted in FIG. 8C, the interactive speed profile bar 150 includes the following speed bar buttons: speed bar button 152i displaying the label "MAX RT 245" (which is the currently active speed segment); speed bar button 152j displaying the label "SEL 0.798"; and speed bar button 152f displaying the label "SEL 0.845". In FIG. 8C, the alphanumeric symbology depicted in speed bar button 152i is boldfaced to indicate that the aircraft is currently flying a maximum rate of climb with a target speed of 245 knots.

In FIG. 8D, the speed bar button 152i is shaded to indicate that speed bar button 152i has been selected by the pilot. For example, the pilot may make the selection by touching the speed bar button 152i. The speed bar button 152i may change color when selected, which change in color is indicated by the aforementioned shading in FIG. 8D. For example, the speed bar button 152i may become green with a magenta outline to indicate pilot selection.

In accordance with the proposed implementation schematically depicted in FIG. 8D, in response to pilot selection of speed bar button 152i, the vertical axis of the vertical situation display 102 is compressed upward and a dialogue box 170 is displayed in the vacated space underneath the vertically compressed vertical situation display 102. The dialogue box 170 is a window that contains graphical control elements that allow the pilot to choose one option from an array of mutually exclusively selectable options. In the example depicted in FIG. 8D, the dialogue box 170 includes the following graphical control elements: a selected speed entry field 172 identifying a SEL speed mode having a fillable target speed field (which the pilot may use to select a specific target speed); a maximum-rate-of-climb button 174 identifying the currently active climb speed mode in which the maximum rate of climb target speed is 245 knots; a pilot-selectable RTA speed mode button 176 identifying an RTA speed mode having a target speed of Mach 0.819; and a pilot-selectable ECON speed mode button 178 identifying an ECON speed mode having a target speed of Mach 0.821.

Figure 12:
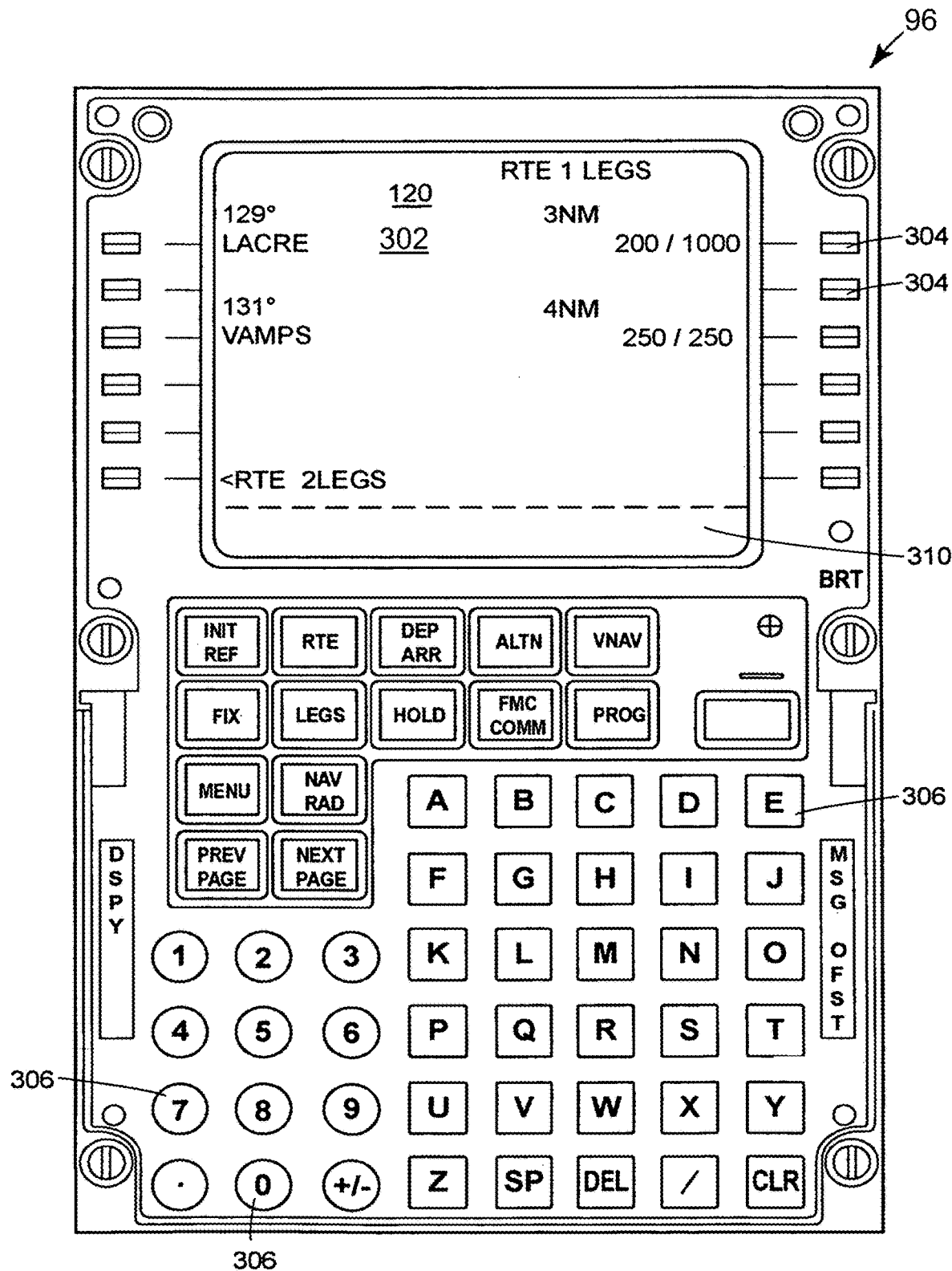
FIG. 12 is a diagram representing a top view of a typical control display unit used for pilot input of flight information to a flight management computer.

If the pilot wishes to enter alphanumeric information in the select speed entry field 172, the pilot first enters the alphanumeric information from the scratchpad area 310 (see FIG. 12). If the selected speed mode option is then selected, a speed is entered, and the information is acceptable to the select speed entry field 172 (the speed profile management application that owns the select speed entry field 172 determines whether the entry is acceptable), the information is transferred to the select speed entry field 172 (see FIG. 8D). More specifically, when the cursor 2 is moved within the active area 4 of the entry box and the selection switch 164a, 164b (see FIGS. 13A and 13B) is pressed, the alphanumeric information is transferred from the scratchpad area 310 into the select speed entry field 172. If the information is not acceptable to the entry box, the information is not transferred and the scratchpad is not cleared. This may also be accomplished by touching the select speed entry field 172 and typing directly into the entry field.

In response to pilot selection of one of the available speed segments identified in FIG. 8D other than the currently active "MAX RT 245" speed segment, alphanumeric symbology identifying the selected speed mode and indicating the target speed will be displayed inside speed bar button 152e in place of the label "MAX RT 245". By touching or clicking on the return-to-previous-range button 158, the pilot may return the vertical situation display 102 and interactive speed profile bar 150 to the states depicted in FIG. 8A.

Figure 9:
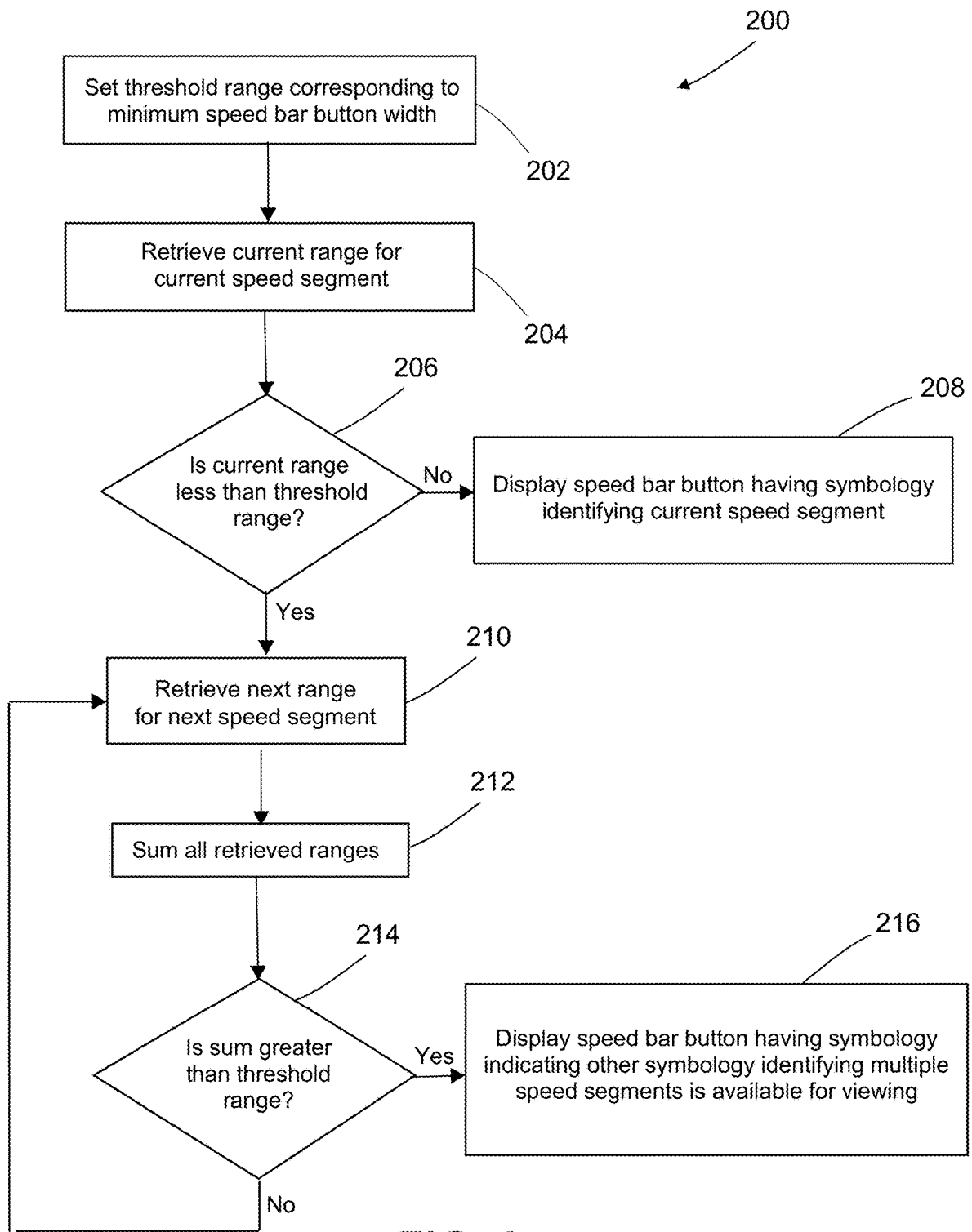
FIG. 9 is a flowchart identifying steps of a method for determining when to display a speed bar button having symbology indicating that other symbology identifying multiple speed segments is available for viewing.

As previously mentioned, the interactive speed profile bar software is configured to display special symbology in a speed bar button corresponding to multiple speed segments having a sum of their ranges which is less than a threshold range associated with a minimum button width. FIG. 9 is a flowchart identifying steps of a method 200 for determining when to display a special speed bar button having symbology indicating that other symbology identifying multiple speed segments is available for viewing. First, a threshold range corresponding to the minimum speed bar button width is set (step 202). For example, a minimum speed bar button width of one inch may correspond to a speed segment range of 50 NM. This may be a default setting or a setting selected by the flight crew. In other words, the interactive speed profile bar 150 is calibrated relative to the horizontal axis of the vertical situation display 102 so that a speed bar button having a button width in excess of the minimum button width would represent a speed segment having a range in excess of the threshold range.

The next step is to retrieve the current range of the current speed segment from the random access memory where the current speed profile is stored (step 204). Then the processor executing the interactive speed profile bar software determines whether the current range of the current speed segment is less than the threshold range corresponding to the minimum button width (step 206). On the one hand, if the processor determines that the current range is not less than the threshold range, then the processor sends instructions to a graphics processor (not shown in the drawings) to display a speed bar button having symbology that identifies the current speed segment and having a button width that is proportional to the current range of current speed segment (step 208). On the other hand, if the processor determines that the current range is less than the threshold range, then the processor retrieves the next range of the next speed segment from random access memory (step 210) and then sums all of the retrieved ranges (step 212), which in this instance is the sum of the current range and the next range.

Still referring to FIG. 9, the processor then determines whether the sum of all retrieved ranges is greater than the threshold range (step 214). On the one hand, if the processor determines that the sum of all retrieved ranges is greater than the threshold range, then the processor sends instructions to the graphics processor to display the special speed bar button 152e (step 216). As previously described, the special speed bar button 152e includes symbology that indicates to the pilot that other symbology identifying multiple speed segments is available for viewing. Also the width of the special speed bar button 152e will be proportional to the sum of all retrieved ranges. For example, if the current range and the next range are both less than the threshold range, the width of special speed bar button 152e will be proportional (in accordance with the initial calibration) to the sum of the current and next ranges.

Figure 10:
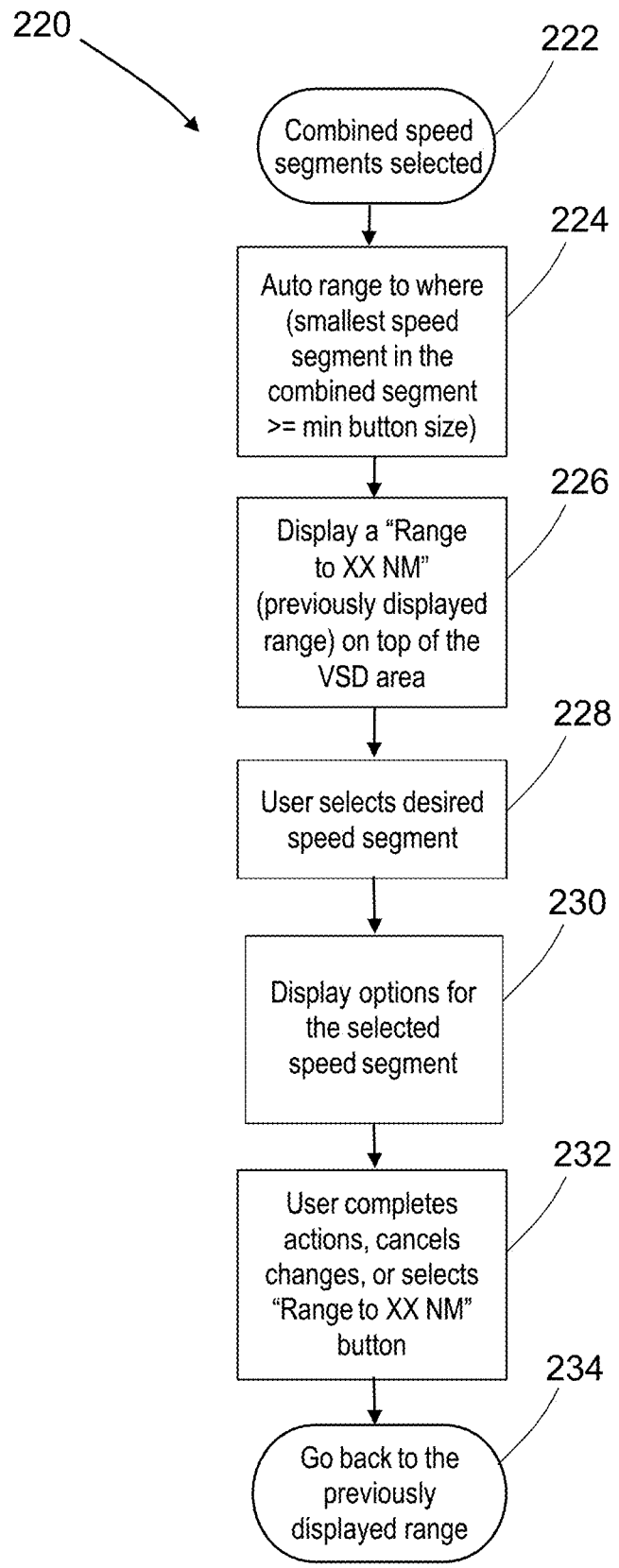
FIG. 10 is a flowchart identifying steps of a method for enabling a pilot to zoom in the range scale of the vertical situation display so that previously undisplayable speed bar buttons may be viewed in a format that satisfies a minimum button width constraint.

FIG. 10 is a flowchart identifying steps of a method 220 for enabling a pilot to change the zoom level of the range scale of the vertical situation display 102 so that previously undisplayable speed bar buttons may be viewed in a format that satisfies a minimum button width constraint. First, the pilot selects the special speed bar button 152e that indicates the availability of multiple speed segments for selection and modification (step 222). In response to that selection, the range scale of the vertical situation display 102 is zoomed in automatically such that the range of the speed segment of shortest range corresponds to the minimum button width and respective speed bar buttons are displayed which correspond to the multiple speed segments previously not identified (step 224). Also a return-to-previous-range button 158 is displayed (see upper left-hand corner of the screenshot presented in FIG. 8C) (step 226). Next the user selects a desired speed segment by touching or clicking on the speed bar button corresponding to the desired speed segment (step 228). As previously described, the dialogue box 170 is then displayed in a space vacated by vertically compressing the vertical situation display 102 (step 230). The pilot then interacts with the dialogue box to change the speed segment or cancels the changes or selects the return-to-previous-range button 158 (step 232). In response to performance of step 232, the original zoom level of the range scale of the vertical situation display 102 is restored (step 234).

The flight management computer is generally connected to some sort of display unit, such as, for example, a control display unit, which displays flight management information for use by the pilots. The CDU 96 generally has an area on the screen, called a scratchpad, which displays information that is available for selection into an entry field. The scratchpad displays characters as they are entered on a keyboard by the pilot. Thus, the pilot is able to check his/her data entry work prior to entry into the FMS. For example, when interacting with a navigation system, the pilot generally enters any needed data into the FMS via the keyboard. Another implementation may support direct entry into the selected field. Flight plan information generally includes, but is not limited to, waypoint and leg information. When the pilot needs to modify, add, and/or delete flight plan data, he/she generally enters waypoint information into the FMS and views the information on the scratchpad area of the CDU. The pilot generally must enter alphanumeric characters of some sort to identify the waypoint.

An aircraft navigational system with a graphical scratchpad may be provided, such system including a processor which runs a software program, an electronic display which displays navigational data, a flight management computer including a central display unit with a scratchpad area, and a cursor control device. The user may use the cursor control device to control a cursor on the electronic display, or a touch screen, and select entry fields on the electronic display for entry from the scratchpad area of the CDU.

Figure 11:
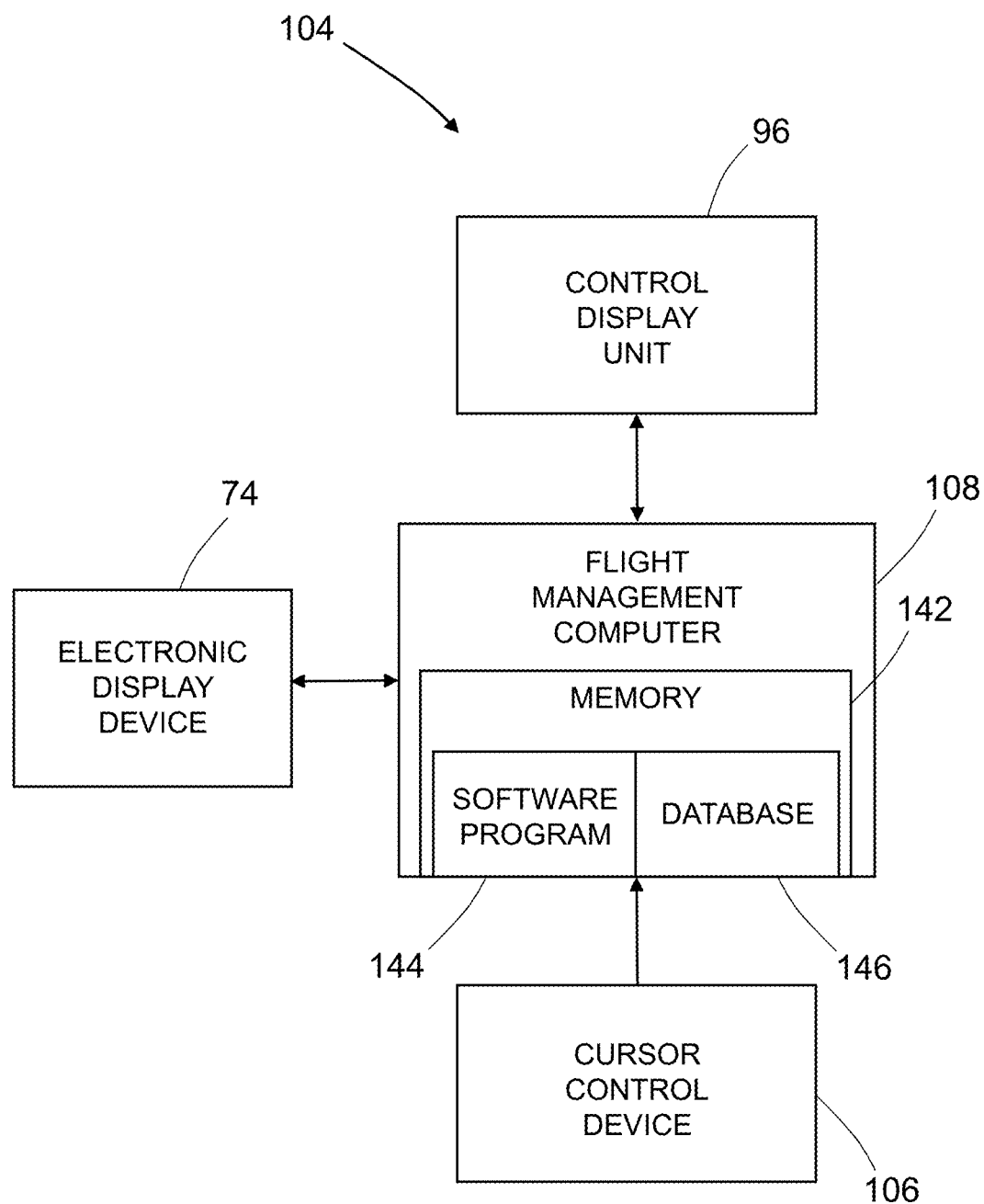
FIG. 11 is a block diagram identifying some components of a flight information display system in accordance with one proposed implementation.

FIG. 11 schematically depicts one embodiment of a flight information display system 104 which enables a pilot to interact with a speed profile bar 150 on a vertical situation display 102. The flight information display system 104 includes a flight management computer 108 that includes a display controller (not shown) for controlling an electronic display device 74. The flight management computer 108 includes a memory 142 containing a software program 144 configured for performing a speed profile management function. More specifically, that speed profile management function is configured to convert signals representing pilot interactions with the graphical user interface shown in FIGS. 7A-7E into a new speed schedule in a digitized format for storage in memory 142. The memory 142 also includes a database 146 which may include waypoint information. The flight information display system 104 further includes a control display unit 96 (hereinafter "CDU 96") and a cursor control device 106, both of which are operatively coupled to the flight management computer 108. The cursor control device 106 enables the pilots to control a cursor on a vertical situation display 102 (not shown in FIG. 11) being displayed on the electronic display device 74 for selection and entry of information into the flight management system. For example, a pilot may first use the cursor control device 106 to interact with the interactive speed profile bar 150 on the vertical situation display 102 (see, e.g., FIG. 7A) to select a fillable field and then use a scratchpad area 310 displayed on a display screen 302 of the CDU 96 (see FIG. 12) to enter data into in the fillable field. Another implementation may support direct entry.

Referring to FIG. 12, the CDU 96 has a display screen 302 that include a scratchpad area 310, line select keys 304 and data entry keys 306. Generally, flight management information is displayed on the CDU 96 for reference and manipulation by the pilot. The pilot enters data into the flight management computer 108 via the line select keys 304 and the data entry keys 306. The line select keys 304 allow the pilot to select options or choices represented by alphanumeric characters visible on the display screen 302. If the pilot needs to enter data into the flight management computer, for example, new waypoint data, the data entry keys 306, which may represent alphanumeric characters similar to a keyboard, may be used for data entry. When the pilot enters data via the data entry keys 306 (and in some cases the line select keys), the entries appear in the scratchpad area 310, and this allows the pilot to check his/her work prior to execution. Final entry of data from the scratchpad area 310 into the flight management computer 108 may be accomplished with an execute key or an enter key (neither shown), or by selecting one of the line select keys 304.

The cursor control device 106 or a touch interface provides for a pilot to interact with the interactive speed profile bar 150 presented on the vertical situation display 102. The cursor control device 106 allows the pilot to point to and select objects on the displays. The cursor provides the user with a visual cue of the current position of the input focus. The cursor is represented by one symbol out of a standard set. The particular symbol displayed at a given time may be dependent on the context of the task (pointing, waypoint picking, or map centering). Users are required to take a separate, explicit action, distinct from cursor positioning, for the actual selection and entry (into the flight management computer 108) of a speed option.

As used herein, the term "cursor" means a symbol on a display which can be moved by the cursor control device. Its shape is dependent on the function that it is currently performing. As used herein, the term "the cursor control device" means the hardware which moves the cursor on the display. The cursor control device 106 may take any one of many forms, including a trackball, a rotary knob tabber and a touchpad. These cursor control devices interact with display features and enable the pilots to perform functions such as selecting menu items on multifunction displays, choosing data to display on the vertical situation display 102, and so forth. In accordance with one proposed implementation, each pilot may have tabbers and a touchpad.

Figure 13A:
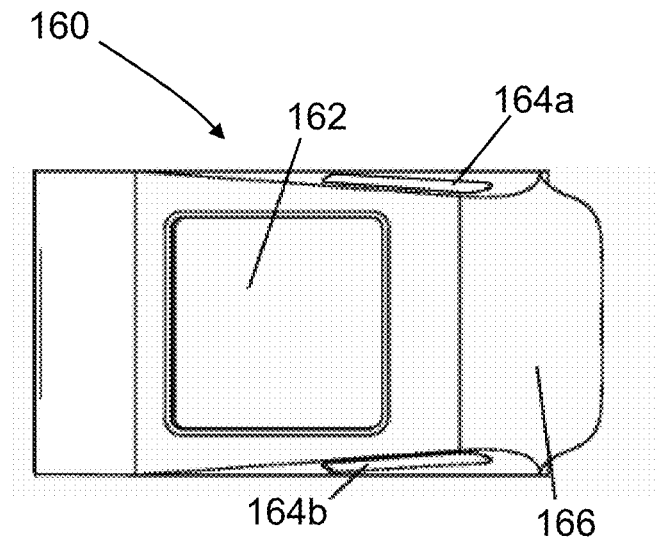
FIGS. 13A and 13B are diagrams representing a top and side views respectively of a cursor control device in accordance with one proposed implementation.
Figure 13B:
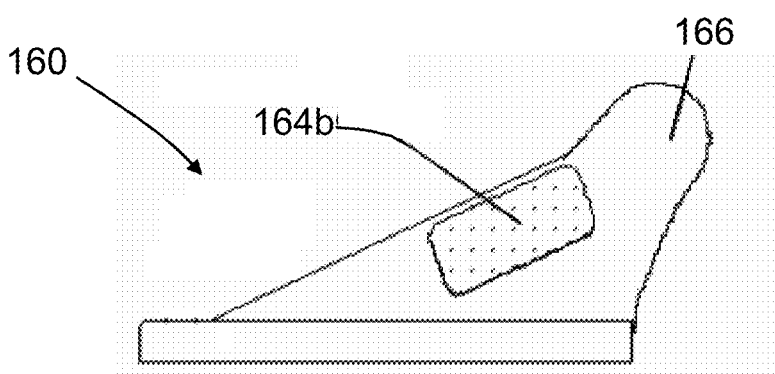

FIGS. 13A and 13B are diagrams representing a top and side views respectively of a touchpad cursor control device 160 in accordance with one proposed implementation. The touchpad cursor control device 160 includes a touchpad 162 made of capacitive glass, a pair of selection switches 164a, 164b and a palm support 166.

A symbol, called a cursor, moves around on the vertical situation display 102 as the touchpad cursor control device 160 is manipulated. The pilot moves the cursor symbol by moving a finger over the touchpad 162 of the touchpad cursor control device 160. Active areas on the vertical situation display 102 are areas which will cause something to happen when selected. To select an active area, the cursor symbol must be moved over an active area on the vertical situation display 102 (a highlight will appear around the active area) and then a selection switch 164a or 164b on the touchpad cursor control device 160 is pressed. Active areas on the vertical situation display 102 may be shown with a gray background and a bezel to produce a three-dimensional appearance, so that it is easy to see at a glance which functions are available on the vertical situation display 102 at any time. The pilot can select an active area by pressing one of the selection switches 164a, 164b on the touchpad cursor control device 160 using a thumb when the following conditions are met: (1) the cursor symbol is in the active area; and (2) the highlight box is displayed.

In addition or in the alternative, the cursor control device 106 identified in FIG. 11 may be a rotary cursor control device (not shown in the drawings) sometimes referred to as a "tabber". The pilot moves the cursor symbol by turning a rotary cursor control device (CCD) either clockwise or counter-clockwise. The cursor symbol will then move from one active area to another on the vertical situation display 102. The pilot can select an active area by pressing the select button in the center of the rotary CCD when the highlight box is displayed around the active area.

In addition or in the alternative, a touch screen (not shown in the drawings) may be used for interacting with the display. The pilot selects buttons by tapping on the surface of the display equipped with a touch sensor.

In accordance with the proposed implementation schematically depicted in FIGS. 7A-7E, a drop-down list 154 is overlaid on a portion of the vertical situation display 102 for the pilot to interact with. In accordance with the proposed implementation schematically depicted in FIGS. 8A-8D, a vertical situation display 102 is compressed vertically to occupy less space and a dialogue box 170 is presented in an area below the vertically compressed vertical situation display 102. In either case, the drop-down list 154 or the dialogue box 170 may contain entry boxes or radio selection buttons or both. Any entry boxes may be filled using a scratchpad or direct entry using a keyboard (physical or virtual).

Figure 14:
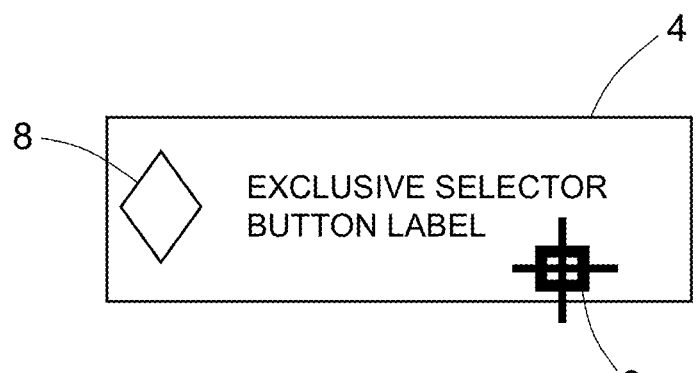
FIG. 14 is a diagram representing an unselected exclusive selector button with a cursor inside the associated active area, the exclusive selector button being of a type suitable for use with the interactive speed segment options depicted in FIG. 7B or 8D.

FIG. 14 is a diagram representing an unselected exclusive selector button 8 with a cursor 2 inside the associated active area 4, the exclusive selector button being of a type suitable for use with the speed segment option interfaces (e.g., drop-down list 154 and dialogue box 170) disclosed herein. Each exclusive selector button is accompanied by a label that identifies what speed mode and speed target each button represents.

Exclusive selector buttons and nonexclusive selector buttons are controls that allow the user to change settings to modify future actions. Exclusive selector buttons are mutually exclusive. A group is defined as a set of a minimum of two mutually exclusive buttons. Selecting one exclusive selector button 8 deselects any other exclusive selector button in that group. All exclusive selector buttons in one group are displayed on the same page. A group of these buttons can be used to force the user to select between a defined set of alternatives.

Exclusive selector buttons are selected and deselected by touching the button on a touchscreen or clicking the cursor selection button when the cursor is within the active area 4 of the exclusive selector button 8. When an exclusive selector button is selected, the inside of the button is filled to show that the exclusive selector button is selected. When the cursor 2 moves within the active area 4 of an exclusive selector button 8, the exclusive selector button is highlighted. The active area 4 may be rectangular and encompass the area around the button symbol, the exclusive selector button label, and the area between the label and the button. In one proposed implementation, the active area is not visible to the user.

While systems and methods for enabling a pilot to manage a speed profile using an interactive speed profile bar that is viewable in conjunction with a vertical situation display have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein. The embodiments described in some detail above may include computer-executable instructions, such as routines executed by a programmable computer. Other computer system configurations may be employed, such as a special-purpose computer or a data processor that is specifically programmed, configured, or constructed to perform one or more of the computer-executable instructions described below.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit. More specifically, the term "computer" as used herein refers to any data processor that can be engaged in a cockpit, including computers for cockpit display systems, flight management computers, flight control computers, electronic flight bags, notebook computer, tablet computer, or other hand-held devices.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for changing a speed profile, the method comprising:
   (a) displaying a vertical situation display and an interactive speed profile bar on a display unit, wherein the vertical situation display represents a planned vertical flight path of the aircraft, and the interactive speed profile bar identifies speed modes and target speeds of at least a portion of a speed profile to be flown by the aircraft and comprises a speed bar button having first alphanumeric symbology which indicates a first speed mode and an associated first target speed of a speed segment;
   (b) interacting with the speed profile bar having the first alphanumeric symbology to select a second speed mode and an associated second target speed of the speed segment; and
   (c) changing speed profile digital data stored in a non-transitory tangible computer-readable storage medium to identify a second speed mode and associated second target speed instead of the first speed mode and associated first target speed of the speed segment in response to performance of step (b).

2. The method as recited in claim 1, wherein step (b) comprises:
   selecting the speed bar button having the first alphanumeric symbology, which selecting is performed by a pilot;
   displaying graphical elements representing a multiplicity of pilot-selectable mutually exclusive speed segment options in response to selecting the speed bar button having the first alphanumeric symbology; and
   selecting one of the speed segment options by interacting with a selected one of the graphical elements, which selecting is performed by the pilot.

3. The method as recited in claim 1, wherein the speed segment is currently active.

4. The method as recited in claim 1, wherein the speed segment is planned and not currently active.

5. The method as recited in claim 1, further comprising flying the aircraft automatically using the changed speed profile digital data.

6. The method as recited in claim 1, further comprising displaying second alphanumeric symbology instead of the first alphanumeric symbology in the speed bar button in response to performance of step (b), wherein the second alphanumeric symbology indicates the second speed mode and associated second target speed.

7. The method as recited in claim 6, further comprising making the graphical elements disappear in response to performance of step (b).

8. The method as recited in claim 6, further comprising flying the aircraft manually using the second alphanumeric symbology for guidance.

9. The method as recited in claim 1, wherein the interactive speed profile bar comprises a multiplicity of speed bar buttons, each of the multiplicity of speed bar buttons having respective alphanumeric symbology identifying a respective speed mode and a respective associated target speed which characterize a respective speed segment included in the speed profile.

10. The method as recited in claim 9, wherein:
    the speed profile includes first and second speed segments having first and second ranges respectively; and
    the interactive speed profile bar includes a first speed bar button having a first button width corresponding to a first range of the first speed segment and a second speed bar button having a second button width corresponding to a second range of the second speed segment, a ratio of the first button width to the second button width being equal to a ratio of the first range to the second range.

11. A method for changing a speed profile, the method comprising:
    (a) displaying a first vertical situation display and a first interactive speed profile bar on a display unit, wherein the first vertical situation display represents a planned vertical flight path of the aircraft, and the first interactive speed profile bar comprises a special speed bar button having symbology that indicates other symbology identifying speed modes and target speeds of multiple speed segments of a speed profile to be flown by the aircraft is available for viewing;
    (b) selecting the special speed bar button, which selecting is performed by a pilot;
    (c) in response to selecting the special speed bar button, displaying a second vertical situation display and a second interactive speed profile bar on the display unit, wherein the second vertical situation display has a range scale with increased fineness and represents only a portion of the planned vertical flight path of the aircraft, and the second interactive speed profile bar comprises multiple speed bar buttons having the other symbology, including a speed bar button having first alphanumeric symbology which indicates a first speed mode and an associated first target speed of a speed segment;
    (d) interacting with the speed profile bar having the first alphanumeric symbology to select a second speed mode and an associated second target speed of the speed segment; and
    (e) changing speed profile digital data stored in a non-transitory tangible computer-readable storage medium to identify a second speed mode and associated second target speed instead of the first speed mode and associated first target speed of the speed segment in response to performance of step (d).

12. The method as recited in claim 11, wherein the second interactive speed profile bar does not include the special speed bar button and comprises first and second speed bar buttons having first and second alphanumeric symbology identifying respective speed modes and respective associated target speeds which respectively characterize first and second speed segments having first and second ranges respectively, the first speed bar button having a first button width corresponding to the first range of the first speed segment and the second speed bar button having a second button width corresponding to the second range of the second speed segment, a ratio of the first button width to the second button width being equal to a ratio of the first range to the second range.

13. The method as recited in claim 11, wherein step (d) comprises:
selecting the speed bar button having the first alphanumeric symbology, which selecting is performed by a pilot;
displaying graphical elements representing a multiplicity of pilot-selectable mutually exclusive speed segment options in response to selecting the speed bar button having the first alphanumeric symbology; and
selecting one of the speed segment options by interacting with a selected one of the graphical elements, which selecting is performed by the pilot.

14. The method as recited in claim 11, further comprising flying the aircraft automatically using the changed speed profile digital data.

15. The method as recited in claim 11, further comprising displaying second alphanumeric symbology instead of the first alphanumeric symbology in the speed bar button in response to performance of step (d), wherein the second alphanumeric symbology indicates the second speed mode and associated second target speed.

16. The method as recited in claim 15, further comprising flying the aircraft manually using the second alphanumeric symbology for guidance.

17. A flight management system for an aircraft comprising:
an electronic display device; and
a flight management computer comprising a display controller for controlling the electronic display device and a memory containing a software program configured for performing a speed profile management function, wherein the flight management computer is configured to display a vertical situation display and an interactive speed profile bar on the electronic display device, and the speed profile management function is configured to convert signals representing pilot interactions with the interactive speed profile bar into a new speed profile in a digitized format for storage in the memory.

18. The flight management system as recited in claim 17, wherein:
the vertical situation display represents a planned vertical flight path of the aircraft; and
the interactive speed profile bar identifies speed modes and target speeds of at least a portion of a speed profile to be flown by the aircraft and comprises a speed bar button having alphanumeric symbology which indicates a speed mode and an associated target speed of a speed segment.

19. The flight management system as recited in claim 18, wherein the interactive speed profile bar comprises a multiplicity of speed bar buttons, each of the multiplicity of speed bar buttons having respective alphanumeric symbology identifying a respective speed mode and a respective associated target speed which characterize a respective speed segment included in the speed profile.

20. The flight management system as recited in claim 19, wherein the flight management computer is configured to change speed profile digital data stored in the non-transitory tangible computer-readable storage medium to identify a second speed mode and associated second target speed instead of a first speed mode and associated first target speed of the speed segment in response to pilot interaction with a speed bar button having alphanumeric symbology which indicates the first speed mode and associated first target speed of the speed segment.

\* \* \* \* \*